United States Patent
Ota

(10) Patent No.: US 7,862,431 B2
(45) Date of Patent: Jan. 4, 2011

(54) STORAGE MEDIUM STORING A GAME PROGRAM, GAME APPARATUS, AND GAME CONTROL METHOD

(75) Inventor: Keizo Ota, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 800 days.

(21) Appl. No.: 11/709,261

(22) Filed: Feb. 22, 2007

(65) Prior Publication Data

US 2008/0096660 A1    Apr. 24, 2008

(30) Foreign Application Priority Data

Oct. 19, 2006    (JP) .............................. 2006-285317

(51) Int. Cl.
*A63F 9/24* (2006.01)
(52) U.S. Cl. .............................. 463/39; 463/32; 463/33; 345/473; 345/474; 345/475
(58) Field of Classification Search .................... 463/36, 463/38, 39, 43, 32, 33; 345/473, 474, 475
See application file for complete search history.

(56) References Cited

U.S. PATENT DOCUMENTS

| 4,905,168 | A | * | 2/1990 | McCarthy et al. | ........... | 345/474 |
| 5,303,386 | A | * | 4/1994 | Fiasconaro | ................. | 345/419 |
| 5,574,479 | A | | 11/1996 | Odell | | |
| 5,627,565 | A | | 5/1997 | Morishita et al. | | |
| 5,680,531 | A | * | 10/1997 | Litwinowicz et al. | ....... | 345/473 |
| 6,570,569 | B1 | * | 5/2003 | Tsukamoto et al. | ......... | 345/473 |
| 6,629,891 | B2 | * | 10/2003 | Nagayama | ................... | 463/32 |
| 6,982,697 | B2 | | 1/2006 | Wilson et al. | | |
| 7,119,817 | B1 | | 10/2006 | Kawakami | | |

(Continued)

FOREIGN PATENT DOCUMENTS

EP    0 978 803    2/2000

(Continued)

OTHER PUBLICATIONS

ADXL202 Specification Sheet: Low Cost ±2 g Dual Axis i MEMs® Accelerometer with Digital Output; Analog Devices, Inc., 1998.

(Continued)

*Primary Examiner*—James S McClellan
*Assistant Examiner*—Brandon Gray
(74) *Attorney, Agent, or Firm*—Nixon & Vanderhye P.C.

(57) ABSTRACT

A video game apparatus includes a CPU, and the CPU allows a game to proceed according to input data transmitted from a controller performed a swing operation by a player. When a ball hit by a player character according to a swing operation performed by the player collides with a target object, a collision location thereof is detected. For example, a normal target image and several different types of broken target images are prepared and one of the broken target images is selected according to the collision location. In addition, a determinant is calculated for placing the broken target image in a virtual three-dimensional space such that a direction oriented toward the collision location from a center of a target object matches a reference direction of the broken target image. Then, the broken target image is placed and thereafter display is provided in such a manner that the target object is breaking.

6 Claims, 16 Drawing Sheets

U.S. PATENT DOCUMENTS

| | | |
|---|---|---|
| 7,139,983 B2 | 11/2006 | Kelts |
| 7,158,118 B2 | 1/2007 | Liberty |
| 7,262,760 B2 | 8/2007 | Liberty |
| 7,292,151 B2 | 11/2007 | Ferguson et al. |
| 7,414,611 B2 | 8/2008 | Liberty |

FOREIGN PATENT DOCUMENTS

| | | |
|---|---|---|
| EP | 1 127 595 | 8/2001 |
| JP | 2000-113225 | 4/2000 |
| JP | 2000-157729 | 6/2000 |

OTHER PUBLICATIONS

ADXL330 Specification Sheet: Small, Low Power, 3-Axis ±3 g i MEMs® Accelerometer; Analog Devices, Inc., 2007.

Pictures of Microsoft Xwand retrieved on May 13, 2009 from http://www.kfl2.com/blogs/uploads/xwand.jpg and http://www.cs.cmu.edu/%7Edwilson/images/xwand.jpg.

Wilson, Andrew D., et al.; "Demonstration of the XWand Interface for Intelligent Spaces"; Microsoft Research; UIST '02 Companion; pp. 37-38.

Wilson, Daniel, et al.; "Gesture Recognition Using The XWand"; Robotics Institute; Carnegie Mellon University; tech report CMU-RI-TR-04-57; Apr. 2004.

Wilson, Andy, "XWand: UI for Intelligent Environments"; Apr. 26, 2004; retrieved May 12, 2009 from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

SELECTECH Air Mouse, Description; retrieved on May 5, 2009 from http://cgi.ebay.com.my/ws/eBayISAPI.dll?ViewItem&item=350096666675&indexURL.

* cited by examiner (A) UPPER SURFACE SIDE (B) LOWER SURFACE SIDE (A) GAME SCREEN 100

(B) GAME SCREEN 100

(A) NORMAL TARGET IMAGE 130

(B) FIRST BROKEN TARGET IMAGE 140

(C) SECOND BROKEN TARGET IMAGE 150

(D) THIRD BROKEN TARGET IMAGE 160

(A) NORMAL TARGET OBJECT (B) SECOND BROKEN TARGET IMAGE (C) SECOND BROKEN TARGET IMAGE

FIG. 9

BROKEN TARGET IMAGE SELECTION TABLE

| DISTANCE d | BROKEN TARGET IMAGE |
|---|---|
| d < L1 | FIRST BROKEN TARGET IMAGE |
| L1 ≦ d < L2 | SECOND BROKEN TARGET IMAGE |
| L2 ≦ d | THIRD BROKEN TARGET IMAGE |

(A) SECOND BROKEN TARGET IMAGE (B) ORIENTATION OF INITIAL SPEED OF EACH PART (C) RESPECTIVE BROKEN PARTS IN INITIAL STAGE (A) TARGET OBJECT (B) SECOND BROKEN TARGET OBJECT (C) HOW TO DETERMINE $\theta$

STORAGE MEDIUM STORING A GAME PROGRAM, GAME APPARATUS, AND GAME CONTROL METHOD

CROSS REFERENCE TO RELATED APPLICATION

The disclosure of Japanese Patent Application No. 2006-285317 is incorporated herein by reference.

TECHNICAL FIELD

The exemplary embodiments disclosed herein relate to a storage medium storing a game program, a game apparatus, and a game control method. More specifically, the exemplary embodiments disclosed herein relate to a storage medium storing a game program, a game apparatus, and a game control method, for a game in which, for example, by hitting a ball or shooting a bullet, a target to be an aim breaks up or a preset change is made.

Generally, a game is well known in which by hitting (rebounding) a ball or shooting (firing) a bullet, a target to be an aim breaks up or a preset change is made. An example of this kind of related art is disclosed in Japanese Patent Application Laying-open No. 2000-113225 [G06T 17/00, A63F 13/00, G06T 15/00, G09G 5/36] laid-open on Apr. 21, 2000 (document 1). In an image processing apparatus of this document 1, display blocks to be spread after breakup are preset as integrally movable display elements and upon representing a scene in which an object is breaking up, a scene is displayed in which a block of a portion of the object colliding with another object is destroyed and a block adjacent to the destroyed block flies off according to the strength of the collision.

Another example of this kind of related art is disclosed in Japanese Patent Application Laying-open No. 2000-157729 [A63F 13/00, G06T15/70] laid-open on Jun. 13, 2000 (document 2). In a game apparatus of this document 2, in order to display the state of damage to an attacking object in an easily understood manner, in response to arrival of a bullet at the attacking object, separation parts are newly created from the attacking target and separated.

In the technique described in the document 1, however, complicated image-processing needs to be performed on each of display blocks integrally forming a single object. In the technique described in the document 2 too, upon displaying damage to an attacking object, when separation parts are separated according to a location where a bullet arrives, polygons need to be newly created to perform a processing.

Therefore, it is a feature of certain exemplary embodiments to provide a novel storage medium storing a game program, game apparatus, and game control method.

It is another feature of certain exemplary embodiments to provide a storage medium storing a game program, a game apparatus, and a game control method that are capable of simplifying an image processing as much as possible to the extent that a game screen does not become monotonous.

Certain exemplary embodiments have the following aspects to attain the feature mentioned above. It should be noted that reference numerals and footnote, etc. which are enclosed in parentheses show only one example of correspondences with the exemplary embodiments described later in order to help the understandings of these exemplary embodiments, and are not intended to be limiting in any way.

A storage medium storing a game program according to certain exemplary embodiments stores a game program for a game apparatus having an operation means, a storage means, and a display means. The game program causes a computer of the game apparatus to function as an operation information acquisition means, a first-object display control means, a target object display means, a second-object display control means, a contact determination means, a distance calculation means, a direction calculation means, and a selection means. The operation information acquisition means acquires operation information from the operation means. The first-object display control means controls display of a first object based on first-object image data stored in the storage means, the first object being fired or rebounded by a player based on the operation information acquired by the operation information acquisition means. The target object display means displays a target object on the display means, the target object being a target for contacting the first object by the player. The second-object display control means controls display of a second object based on any of a plurality of second-object image data stored in the storage means, the second object including a plurality of part images and having a same appearance as the target object. The contact determination means determines whether the first object has contacted the target object. The distance calculation means calculates, when it is determined by the contact determination means that the first object has contacted the target object, a distance from a center of the target object to a contact location. The direction calculation means calculates, when it is determined by the contact determination means that the first object has contacted the target object, a direction oriented toward the contact location from the center of the target object. The selection means selects any of a plurality of second objects according to the distance calculated by the distance calculation means. Then, the second-object display control means allows the second object selected by the selection means to be displayed so as to be oriented in the direction calculated by the direction calculation means, and allows, after the display, each of the plurality of part images including the second object to be randomly moved and displayed.

Specifically, a game apparatus (12) includes an operation means (22), a storage means (40), and a display means (34). A game program causes a computer of the game apparatus to function as an operation information acquisition means (36, S5), a first-object display control means (36, S3), a target object display means (36, S1, S21), a second-object display control means (36, S17), a contact determination means (36, S9, S15), a distance calculation means (36, S43), a direction calculation means (36, S47), and a selection means (36, S45). The operation information acquisition means acquires operation information from the operation means. The first-object display control means controls display of a first object (110) based on first-object image data (92b) stored in the storage means, the first object (110) being fired or rebounded by a player based on the operation information acquired by the operation information acquisition means. The target object display means displays a target object (108) on the display means, the target object (108) being a target for contacting the first object by the player. The second-object display control means controls display of a second object (140, 150, 160) based on any of a plurality of second-object image data (92d) stored in the storage means, the second object (140, 150, 160) including a plurality of part images (P1, P2, P3, P4) and having a same appearance as the target object. The contact determination means determines whether the first object has contacted the target object. The distance calculation means calculates, when it is determined by the contact determination means that the first object has contacted the target object ("YES" in S9 and S15), a distance (d) from a center (P) of the target object to a contact location (Q). The direction calculation means calculates, when it is determined by the contact determination means that the first object has contacted the target object, a direction oriented toward the contact location from the center of the target object. The selection means selects any of a plurality of second objects according to the distance calculated by the distance calculation means. Then, the second-object display control means allows the second object selected by the selection means to be displayed so as to be oriented in the direction calculated by the direction calculation means, and allows, after the display, each of the plurality of part images including the second object to be randomly moved and displayed. Accordingly, by a first object coming into contact with a target object, a scene in which the target object is breaking is displayed.

According to certain exemplary embodiments, a second object selected according to a contact location is simply displayed so as to be oriented in a direction oriented toward the contact location from a center of a target object, and thus, image processing can be simplified as much as possible to the extent that a game screen does not become monotonous.

In one aspect of certain exemplary embodiments, the second-object display control means allows the plurality of part images including the second object to be randomly moved and displayed, based on a physical computation with an initial speed of random magnitude being set to each of the plurality of part images and gravity being set in a downward direction of a display screen. Specifically, the second-object display control means performs movement and display based on a physical computation with an initial speed of random magnitude being set to each of the plurality of part images including the second object and gravity being set in a downward direction of a display screen. That is, movement of the part images is controlled such that the part images perform parabolic motion or vertical projectile motion. As such, movement of each part image is simply controlled by a physical computation, and thus, a scene in which a target object is broken can be represented by a simple computation.

In another aspect of certain exemplary embodiments, the second-object display control means determines directions of vectors with respective start points being first world coordinates of a joint point of the plurality of part images including the second object and respective end points being second world coordinates of display reference locations of the respective plurality of part images, as directions of the respective initial speeds. Specifically, the second-object display control means determines directions of vectors with respective start points being first world coordinates of a joint point (120) of the plurality of part images including the second object and respective end points being second world coordinates of display reference locations (P1G, P2G, P3G, P4G) of the respective plurality of part images, as directions of the respective initial speeds. As such, the directions of initial speeds such that a plurality of part images move radially with a joint point being the center are determined, and thus, a scene in which a target object breaks and flies off can be represented. Hence, a realistic game screen can be displayed.

In still another aspect of certain exemplary embodiments, each of the part images includes a single or a plurality of polygons. Specifically, each of the part images includes a single or a plurality of polygons. By such part images, a second object is constituted. Namely, a second object of a planar-dimensional-shaped or three-dimensional-shaped target object can be constituted.

A game apparatus according to certain exemplary embodiments includes an operation means, a storage means, and a display means. The game apparatus includes an operation information acquisition means, a first-object display control means, a target object display means, a second-object display control means, a contact determination means, a distance calculation means, a direction calculation means, and a selection means. The operation information acquisition means acquires operation information from the operation means. The first-object display control means controls display of a first object based on first-object image data stored in the storage means, the first object being fired or rebounded by a player based on the operation information acquired by the operation information acquisition means. The target object display means displays a target object on the display means, the target object being a target for contacting the first object by the player. The second-object display control means controls display of a second object based on any of a plurality of second-object image data stored in the storage means, the second object including a plurality of part images and having a same appearance as the target object. The contact determination means determines whether the first object has contacted the target object. The distance calculation means calculates, when it is determined by the contact determination means that the first object has contacted the target object, a distance from a center of the target object to a contact location. The direction calculation means calculates, when it is determined by the contact determination means that the first object has contacted the target object, a direction oriented toward the contact location from the center of the target object. The selection means selects any of a plurality of second objects according to the distance calculated by the distance calculation means. Then, the second-object display control means allows the second object selected by the selection means to be displayed so as to be oriented in the direction calculated by the direction calculation means, and allows, after the display, each of the plurality of part images including the second object to be randomly moved and displayed.

In the certain exemplary embodiments of the game apparatus too, as with the certain exemplary embodiments of the above-described storage medium, image processing can be simplified as much as possible to the extent that a game screen does not become monotonous.

A game control method according to certain exemplary embodiments is a game control method for a game apparatus including an operation means, a storage means, and a display means. The game control method includes the following steps of: (a) acquiring operation information from the operation means; (b) controlling display of a first object based on first-object image data stored in the storage means, the first object being fired or rebounded by a player based on the operation information acquired in the step (a); (c) displaying a target object on the display means, the target object being a target for contacting the first object by the player; (d) controlling display of a second object based on any of a plurality of second-object image data stored in the storage means, the second object including a plurality of part images and having a same appearance as the target object; (e) determining whether the first object has contacted the target object; (f) calculating, when it is determined in the step (e) that the first object has contacted the target object, a distance from a center of the target object to a contact location; (g) calculating, when it is determined in the step (e) that the first object has contacted the target object, a direction oriented toward the contact location from the center of the target object; (h) selecting any of a plurality of second objects according to the distance calculated in the step (f); and (i) allowing the second object selected in the step (h) to be displayed so as to be oriented in the direction calculated in the step (g), and allowing, after the display, each of the plurality of part images including the second object to be randomly moved and displayed.

In the certain exemplary embodiments of the game control method too, as with the certain exemplary embodiments of the above-described storage medium, image processing can be simplified as much as possible to the extent that a game screen does not become monotonous.

The above described features, aspects and advantages of the certain exemplary embodiments described herein will become more apparent from the following detailed description when taken in conjunction with the accompanying drawings.

BRIEF DESCRIPTION OF THE DRAWINGS

FIG. 9 is an illustrative view showing an example of a broken target image selection table for selecting a broken target image to be used when providing break display of the target object on the game screen;

DETAILED DESCRIPTION

Figure 1:
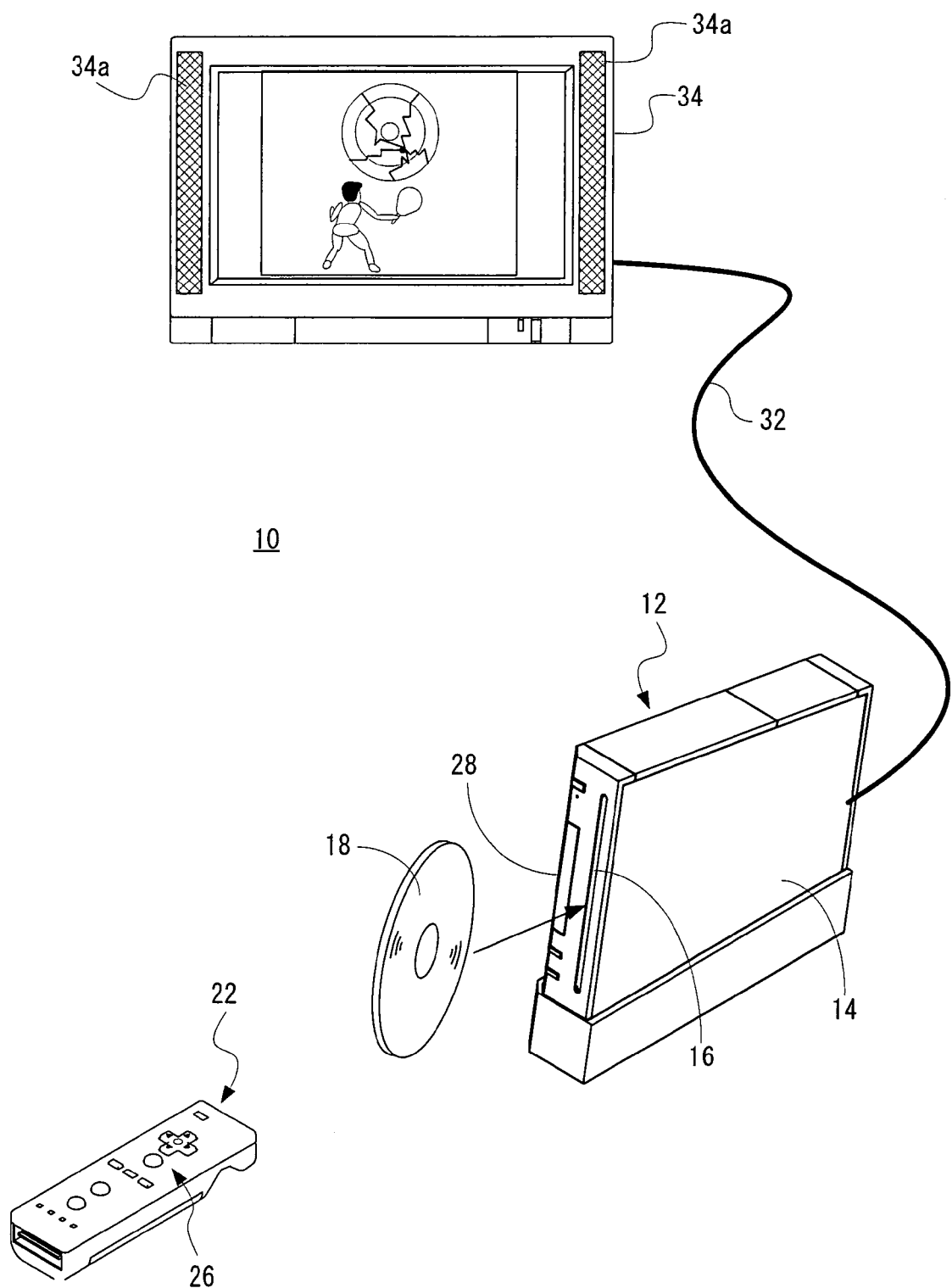
FIG. 1 is an illustrative view showing an exemplary embodiment of a game system of certain exemplary embodiments.

Referring to FIG. 1, a game system 10 of one exemplary embodiment includes a video game apparatus 12 and a controller 22. Additionally, in this exemplary embodiment, the video game apparatus 12 is designed so as to be communicably connectable with a maximum of four controllers 22. Also, the video game apparatus 12 and each of the controllers 22 are connected by radio. For example, wireless communication is executed according to Bluetooth (registered trademark) standard, and may be executed by other standards, such as infrared rays and wireless LAN.

In this exemplary embodiment, according to this exemplary embodiment, radio communication is performed between the video game apparatus 12 and the controller 22, and therefore it is not originally preferable to use the term, "connection". However, as the term expressing a connected state capable of communicating between the video game apparatus 12 and the controller 22, the term for the cable communication is borrowed and the term "connection" is therefore used for convenience.

The video game apparatus 12 includes a roughly rectangular parallelepiped housing 14, and the housing 14 is provided with a disk slot 16 on a front surface. An optical disk 18 (see FIG. 2) as one example of an information storage medium storing game program, etc. is inserted into the disk slot 16 to be loaded in a disk drive 68 (see FIG. 2) within the housing 14.

On the front surface of the housing 14 of the video game apparatus 12 and near the disk slot 16 is provided a memory card slot cover 28. Inside the memory card slot cover 28, a memory card slot (not illustrated) is provided into which an external memory card (hereinafter, simply referred to as "memory card") 30 (see FIG. 2) is inserted. The memory card 30 is employed for loading the game program, etc. read from the optical disk 18 to temporarily store it, storing (saving) game data (result data or proceeding data of the game) of the game played by means of the game system 10, and so forth. It should be noted that storing the game data described above may be performed, in place of the memory card 30, on an internal memory by providing the internal memory, such as a flash memory, etc. inside the video game apparatus 12.

The video game apparatus 12 has an AV cable connector (not illustrated) on the rear surface of the housing 14, and by utilizing the connector, a monitor 34 is connected to the video game apparatus 12 via an AV cable 32. The monitor 34 is typically a color television receiver, and the AV cable 32 inputs a video signal from the video game apparatus 12 to a video input terminal of the color television, and inputs a sound signal to a sound input terminal. Accordingly, a game image of a three-dimensional (3D) video game, for example, is displayed on the screen of the color television (monitor) 34, and stereo game sound, such as a game music, a sound effect, etc. is output from right and left speakers 34a.

Furthermore, the power of the video game apparatus 12 is applied by means of a general AC adapter (not illustrated). The AC adapter is inserted into a standard wall socket for home use, and the video game apparatus 12 transforms the house current (commercial power supply) to a low DC voltage signal suitable for driving. In another exemplary embodiment, a battery may be utilized as a power supply.

In the game system 10, a user or a player turns the power of the video game apparatus 12 on for playing the game (or other applications). Then, the user selects an appropriate optical disk 18 storing a video game (or other applications the player wants to play), and loads the optical disk 18 on the disk drive 68 of the video game apparatus 12 through the disk slot 16. In response thereto, the video game apparatus 12 starts to execute a video game or other applications on the basis of the software stored in the optical disk 18. The user operates the controller 22 in order to apply an input to the video game apparatus 12.

Figure 2:
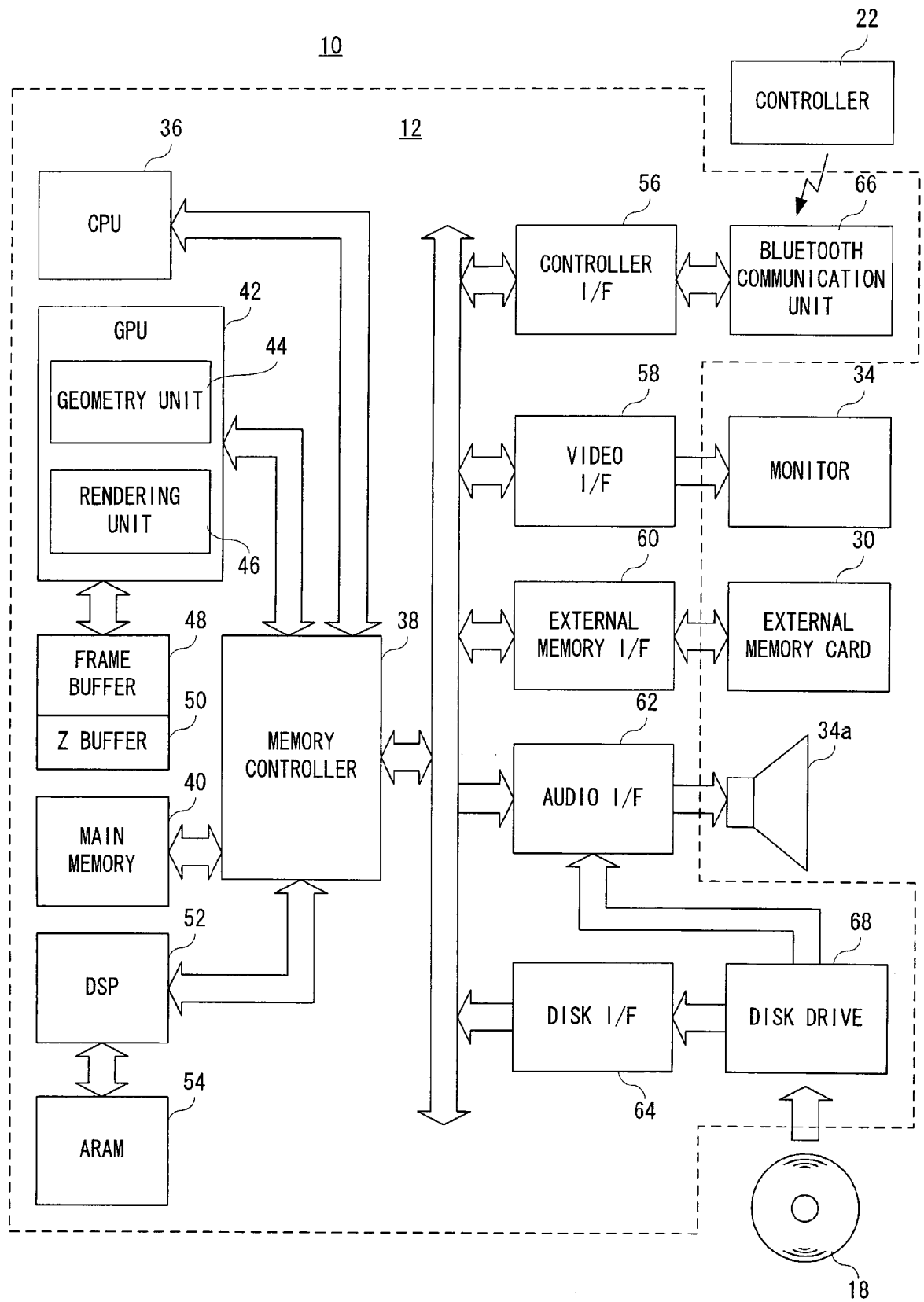
FIG. 2 is a block diagram showing an electrical configuration of the game system shown in FIG. 1.

FIG. 2 is a block diagram showing an electric configuration of the video game system 10 in FIG. 1 exemplary embodiment. A CPU 36 is provided in the video game apparatus 12. The CPU 36 is in charge of an overall control of the video game apparatus 12. The CPU 36 functions as a game processor, and is connected with a memory controller 38 via a bus. The memory controller 38 mainly controls writing and reading of a main memory 40 connected via the bus under the control of the CPU 36. The memory controller 38 is connected with a GPU (Graphics Processing Unit) 42.

The GPU 42 forms a part of a rendering means, and is constituted by a single chip ASIC, for example, receives a graphics command (rendering command) from the CPU 36 via the memory controller 38, and by following the command thus received, generates a 3D game image by a geometry unit 44 and a rendering unit 46. Namely, the geometry unit 44 performs arithmetic processing of rotation, movement, and deformation, etc, of each kind of object of three-dimensional coordinate system (formed of a plurality of polygons, and the polygon refers to a polygonal plane defined by at least three vertexes coordinates.) The rendering unit 46 performs image generation processing such as attaching a texture (texture image) to each polygon of each kind of object, and so forth. Accordingly, the 3D image data to be displayed on the game screen is generated by the GPU 42, and the image data thus generated is stored in a frame buffer 48.

Note that necessary data (primitive or polygon and texture, etc) in performing the graphics command by the GPU 42 is obtained from the main memory 40 by the GPU 42 via the memory controller 38.

The frame buffer 48 is a memory for drawing (accumulating) the image data of one frame of a raster scan monitor 34, for example, and is overwritten for every one frame by the GPU 42. Specifically, the frame buffer 48 sequentially stores chromatic information of an image for each one pixel. Here, the chromatic information refers to data on R, G, B, A, and for example, corresponds to R (red) data of 8 bits, G (green) data of 8 bits, B (blue) data of 8 bits, and A (alpha) data of 8 bits. Note that A data is the data on a mask (mat image). The 3D image of the game image is displayed on the screen of the monitor 34 by reading the data of the frame buffer 48 via the memory controller 38 by a video I/F 58 as will be described later.

In addition, a Z buffer 50 has a storage capacity corresponding to the number of bits of depth data per the number of pixels corresponding to the frame buffer 48 X one pixel, and stores depth information or depth data (Z value) of dots corresponding to each storage location of the frame buffer 48.

Both of the frame buffer 48 and the Z buffer 50 may be constituted by using one portion of the main memory 40, and also these buffers may be provided inside the GPU 42.

In addition, the memory controller 38 is connected to a RAM for audio (referred to as "ARAM" hereafter), via a DSP (Digital Signal Processor) 52. Accordingly, the memory controller 38 controls writing and/or reading of the ARAM 54 as a sub-memory as well as that of the main memory 40.

The DSP 52 works as a sound processor, and generates audio data corresponding to sound, voice or music necessary for the game, by using sound data (not shown) stored in the main memory 40 and by using sound wave (tone) data (not shown) written in the ARAM 54.

The memory controller 38 is further connected to each interface (I/F) 56, 58, 60, 62, and 64 by the bus. The controller I/F 56 is an interface for the controller 22 connected to the video game apparatus 12 via a Bluetooth communication unit 66. More specifically, the Bluetooth communication unit 66 receives input data sent from the controller 22, and the controller I/F 56 applies the input data to the CPU 36 through the memory controller 38. It should be noted that in this exemplary embodiment, the input data includes at least any one of operation data, acceleration data, and marker coordinate data described later. Also, the Bluetooth communication unit 66 receives audio data created by the CPU 36 through the main memory 40 and the controller I/F 56, and sends the received audio data to the controller 22 to be sent. However, in this exemplary embodiment, input data includes at least one of operation data and acceleration data as describe above.

It should be noted that in FIG. 2, only one controller 22 is displayed for simplicity, but as described by utilizing FIG. 1, a maximum of four controllers 22 are connected to the video game apparatus 12.

The video I/F 58 accesses the frame buffer 48, reads the image data generated by the GPU 42, and applies an image signal or the image data (digital RGBA pixel value) to the monitor 34 via the AV cable 32 (FIG. 1).

The external memory I/F 60 associates the memory card 30 (FIG. 1) inserted into the front face of the video game apparatus 12 with the memory controller 38. Whereby, the CPU 36 can write the data into the memory card 30, or can read out the data from the memory card 30 via the memory controller 38. The audio I/F 62 receives audio data given from the DSP 52 through the memory controller 38 or audio stream read from the optical disk 18, and gives an audio signal (sound signal) corresponding thereto to a speaker 34a of the monitor 34.

Further, the disk I/F 64 connects the disk drive 68 to the memory controller 38, and therefore the CPU 36 controls the disk drive 68. By this disk drive 68, program data and texture data, etc, read out from the optical disk 18 are written into the main memory 40 under the control of the CPU 36.

Figure 3:
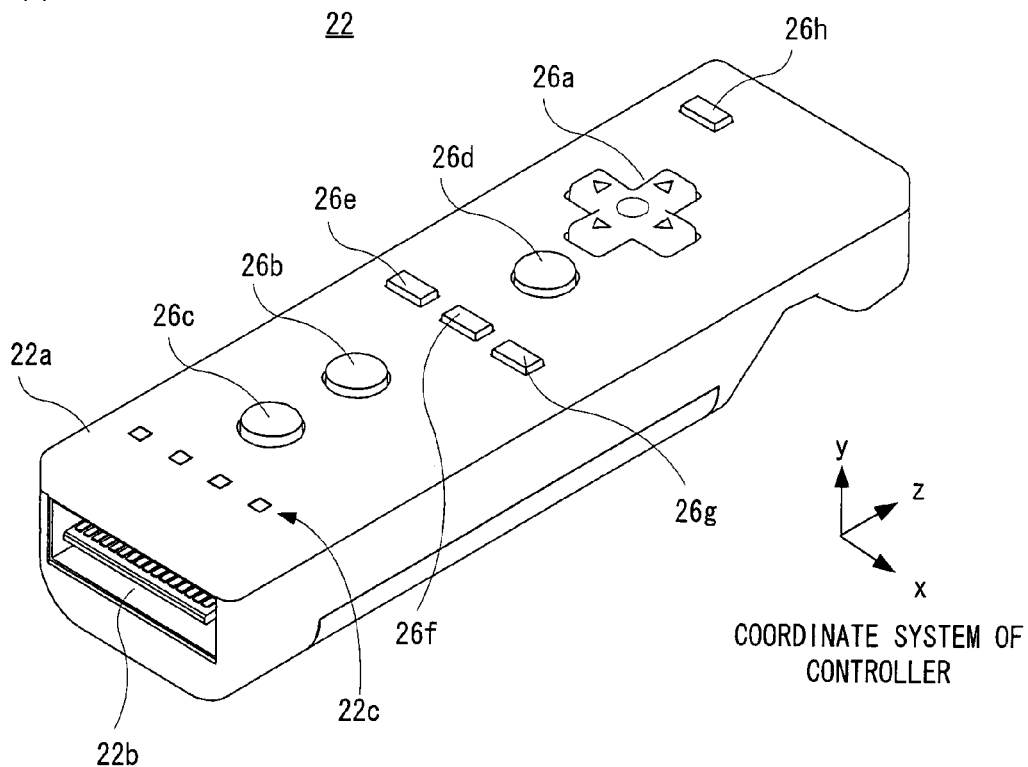
FIG. 3 is an illustrative view for describing an appearance of a controller shown in FIG. 1.
Figure 3:
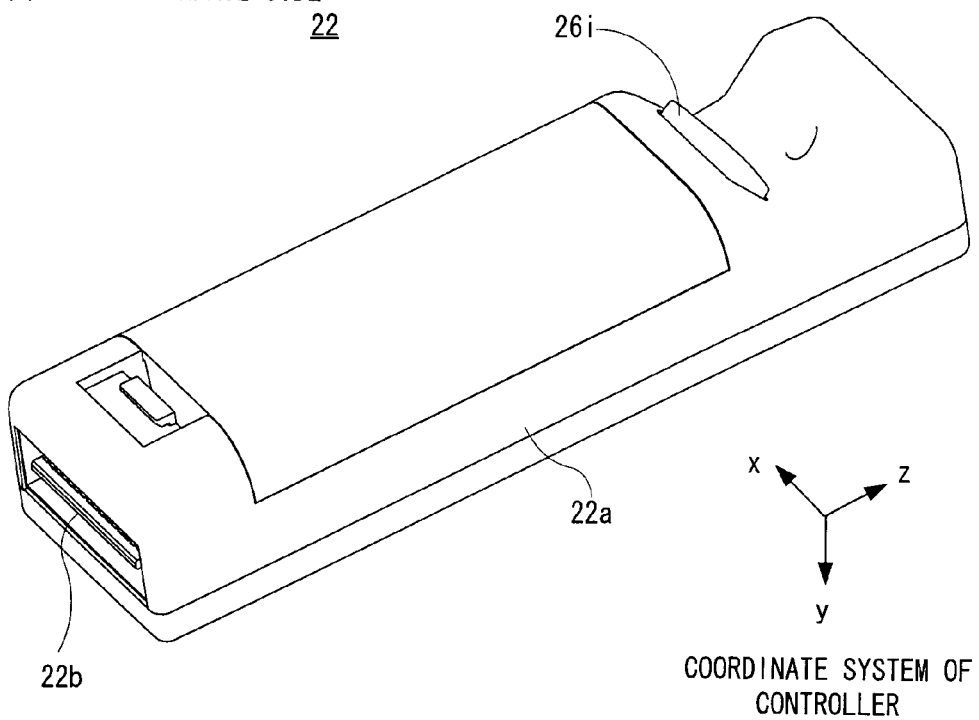

FIG. 3 (A) and FIG. 3 (B) are perspective views showing an external appearance configuration of the controller 22. FIG. 3 (A) is an oblique perspective view of the controller 22 seen from the upper surface side, and FIG. 3 (B) is an oblique perspective view of the controller 22 seen from the lower surface side.

Referring to FIG. 3 (A) and FIG. 3 (B), the controller 22 has a housing 22a formed by plastic molding, for example. The housing 22a is formed into an approximately rectangular parallelepiped shape, having a size small enough to be held by one hand of a user. As described above, the input means (a plurality of buttons or switches) 26 are provided in the housing 22a (controller 22). Specifically, as shown in FIG. 3 (A), on an upper face of the housing 22a (controller 22), there are provided a cross key 26a, X-button 26b, Y-button 26c, A-button 26d, select switch 26e, menu (home) switch 26f, start switch 26g, and power supply switch 26h. Moreover, as shown in FIG. 3 (B), a concave portion is formed on a lower face of the housing 22a, and B-trigger switch 26i is formed on a rearward inclined surface of the concave portion.

The cross key 26a is a four directional push switch, including four directions of front (or upper), back (or lower), right and left operation parts. By operating any one of the operation parts, it is possible to instruct a moving direction of a character or object (player character or player object) that is be operable by a player or instruct the moving direction of a cursor.

The X-button 26b and the Y-button 26c are respectively push button switches, and are used for adjusting a viewpoint position and a viewpoint direction on displaying the 3D game image, i.e. a position and an image angle of a virtual camera. Alternatively, the X-button 26b and the Y-button 26c can be used for the same operation as that of the A-button 26d and the B-trigger switch 26i or an auxiliary operation.

The A-button switch 26d is the push button switch, and is used for causing the player character or the player object to take an action other than that instructed by a directional instruction, specifically arbitrary actions such as punching, throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command and so forth.

The select switch 26e, menu switch 26f, start switch 26g, and power supply switch 26h are also push button switches. The select switch 26e is used for selecting a game mode. The menu switch 26f is used for displaying a game menu (menu screen). The start switch 26g is used for starting (re-starting) or temporarily posing the game. The power supply switch 26h is used for turning on/off a power supply of the video game apparatus 12 by remote control.

In this exemplary embodiment, note that the power supply switch for turning on/off the controller 22 itself is not provided, and the controller 22 is set at on-state by operating any one of the switches or buttons of the input means 26 of the controller 22, and when not operated for a certain period of time (30 seconds, for example) or more, the controller 22 is automatically set at off-state.

The B-trigger switch 26i is also the push button switch, and is mainly used for inputting a trigger such as shooting. In a fixed case, the B-trigger switch 26i functions in the same way as a normal B-button, and is used for canceling the action determined by the A-button 26d.

As shown in FIG. 3 (A), an external expansion connector 22b is provided on a back end surface of the housing 22a, and an indicator 22c is provided on the top surface and the side of the back end surface of the housing 22a. The externally expanding connector 22b is used for connecting another controller not shown. The indicator 22c is constituted by four LEDs, for example, and by lighting any one of the four LEDs, identification information (the controller no.) of the controller 22 is shown.

Note that the shape of the controller 22 shown in FIG. 3 and the shape, number and setting position of each input means 26 are simply examples, and needless to say, even if they are suitably modified, the certain exemplary embodiments described herein can be realized.

Figure 4:
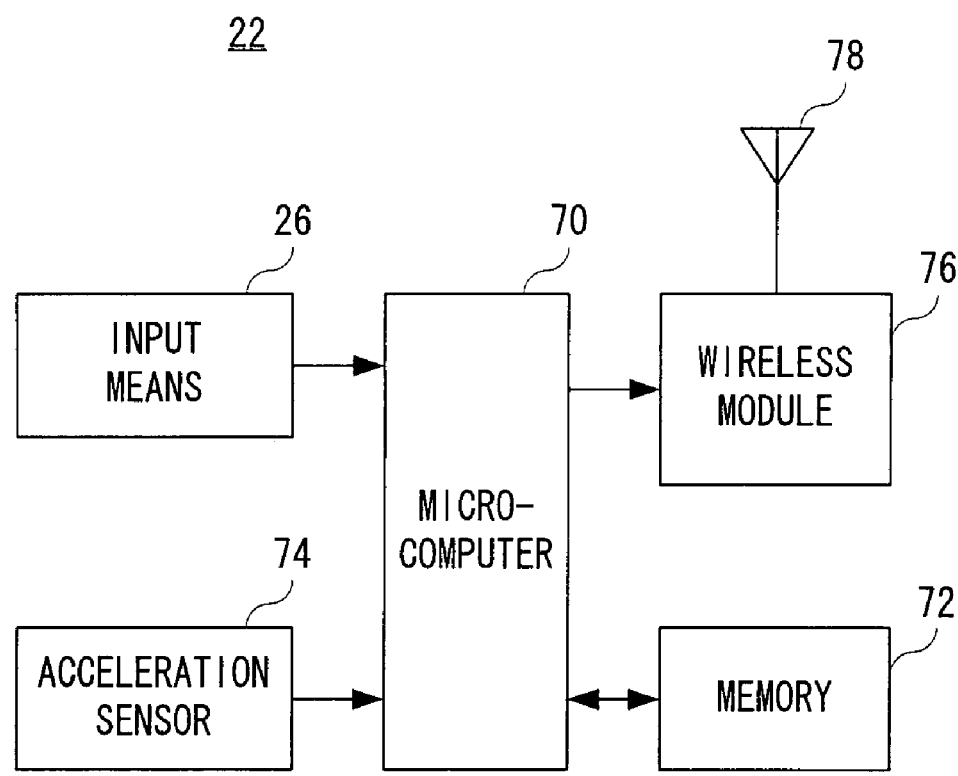
FIG. 4 is a block diagram showing an electrical configuration of the controller shown in FIG. 1.

FIG. 4 is a block diagram showing the electric configuration of the controller 22. Referring to FIG. 4, the controller 22 includes a microcomputer 70, and an input means 26, a memory 72, an acceleration sensor 74, and a radio module 76 are connected to the microcomputer 70 by an internal bus (not shown). Moreover, an antenna 78 is connected to the radio module 76.

In FIG. 4, for simplicity, the above-described external expansion connector 22b, indicator 22c (LED), and power circuit are omitted. Though not shown, the controller 22 contains a vibrator, a speaker, and the like.

The microcomputer 70 is in charge of an overall control of the controller 22, and transmits (inputs) information (input information) inputted by the input means 26 and the acceleration sensor 74 as input information data, to the video game apparatus 12 via the radio module 76 and the antenna 78. At this time, the microcomputer 70 uses the memory 72 as a working area or a buffer area.

An operation signal (operation data) from the aforementioned input means 26 (26a to 26i) is inputted in the microcomputer 70, and the microcomputer 70 stores the operation data once in the memory 72.

Moreover, the acceleration sensor 74 detects each acceleration in directions of three axes of vertical direction (y-axial direction shown in FIG. 3), lateral direction (x-axial direction shown in FIG. 3), and forward and rearward directions (z-axial direction shown in FIG. 3). The acceleration sensor 74 is typically an acceleration sensor of an electrostatic capacity type, but the acceleration sensor of other type may also be used.

In this exemplary embodiment, although omitted in FIG. 3 (A) and FIG. 3 (B), the acceleration sensor 74 is provided inside the housing 22a and in the vicinity of a place where the cross key 26a is arranged.

For example, the acceleration sensor 74 detects the accelerations (ax, ay, az) in each direction of x-axis, y-axis, z-axis for each first predetermined time (such as 200 msec), and inputs the data of the acceleration (acceleration data) thus detected in the microcomputer 70. For example, the acceleration sensor 74 detects the acceleration in each direction of the axes in a range from $-2.0$ g to $2.0$ g (g indicates a gravitational acceleration in real world. The same thing can be said hereafter). The microcomputer 70 detects the acceleration data given from the acceleration sensor 74 for each second predetermined time (for example, 1 frame: each screen update unit time ($1/60$ sec)), and stores it in the memory 72 once.

The microcomputer 70 generates input data including at least one of the operation data, acceleration data and the marker coordinate data, and transmits the input data thus generated to the video game apparatus 12 for each third predetermined time (1 frame).

The radio module 76 modulates a carrier of a predetermined frequency by the input information data, by using a technique of Bluetooth (registered trademark), for example, and emits its weak radio wave signal from the antenna 78. Namely, the input information data is modulated to the weak radio wave signal by the radio module 76 and transmitted from the antenna 78 (controller 22). The weak radio wave signal thus transmitted is received by the reception unit 24 loaded on the aforementioned video game apparatus 12. The weak radio wave thus received is subjected to demodulating and decoding processing, thus making it possible for the video game apparatus 12 (CPU 36) to acquire the input information data from the controller 22. Then, the CPU 36 performs game processing, following the input information data and the program (game program).

Figure 5:
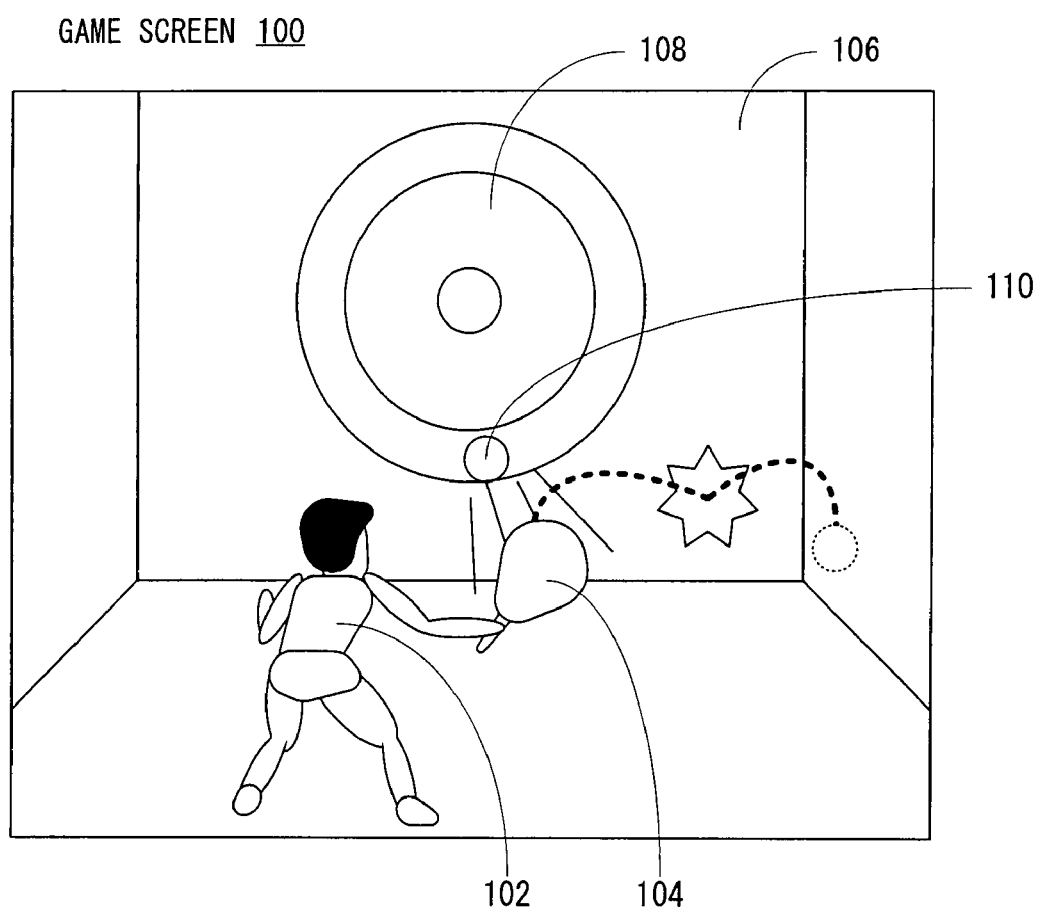
FIG. 5 is an illustrative view showing an example of a game screen displayed on a monitor shown in FIG. 1.

FIG. 5 is an illustrative view showing an example of a game screen 100 of a virtual game that can be played in the game system 10 of this exemplary embodiment.

Referring to FIG. 5, a player character 102 is displayed on the game screen 100 and the player character 102 has a racket 104. An object (target object) 108 as a target is displayed on a wall 106. In this exemplary embodiment, the target object 108 has a circular or disk-like shape. In addition, a ball 110 is displayed on the game screen 100.

For example, on the game screen 100, the player character 102 hits a ball 110 that is served or rebounds off the wall 106 (including the target object 108) according to a player's operation. At this time, the player aims at the target object 108. A ball 110 to be served appears at an arbitrary location on the game screen 100, hits the wall 106 or a floor, and moves toward the player character 102.

The game screen 100 in FIG. 5 shows a scene in which the player character 102 has hit a ball 110 having rebounded off the wall 106.

In this exemplary embodiment, it is assumed that coordinates in a virtual three-dimensional space (world coordinates) have an X-axis in a left-right direction (lateral direction) in a horizontal plane, a Z-axis in a back-and-forth direction (depth direction) in the horizontal plane, and a Y-axis in an up-down direction (height direction). The right direction is a plus direction of the X-axis, an upward vertical direction relative to the paper is a plus direction of the Z-axis, and an upward direction is a plus direction of the Y-axis.

Though not shown, for example, by the player holding the controller 22 with one hand and performing an action as if swinging a real racket (swing operation), the player can cause the player character 102 to perform an action of hitting a ball 110 (hit action). This is made possible by detecting acceleration data from the acceleration sensor 74 such as the one described above. Though a detailed description is not give herein, when the player holds the controller 22 properly and performs a swing operation, an acceleration of a certain value (2.0 g) or more appears in a z-axis direction of the acceleration sensor 74 over a certain period of time (e.g., several tens of frames). The CPU 36 detects input data, detects acceleration data included in the input data, and determines whether there is an instruction for a swing operation, i.e., a hit action.

Note that although in this exemplary embodiment by performing a swing operation on the controller 22 an instruction for a hit action is inputted, it is also possible to provide an instruction for a hit action by performing a button operation on the controller 22.

Figure 6:
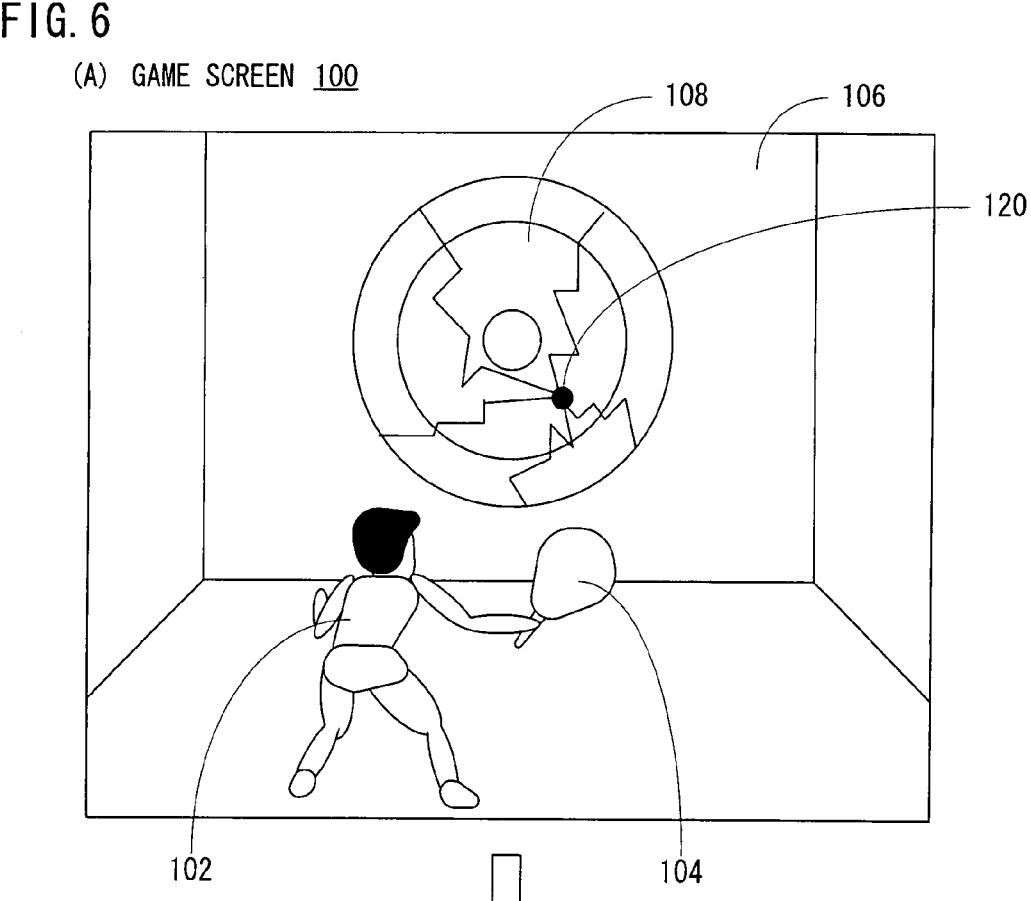
FIG. 6 is an illustrative view showing another example of the game screen displayed on the monitor shown in FIG. 1.
Figure 6:
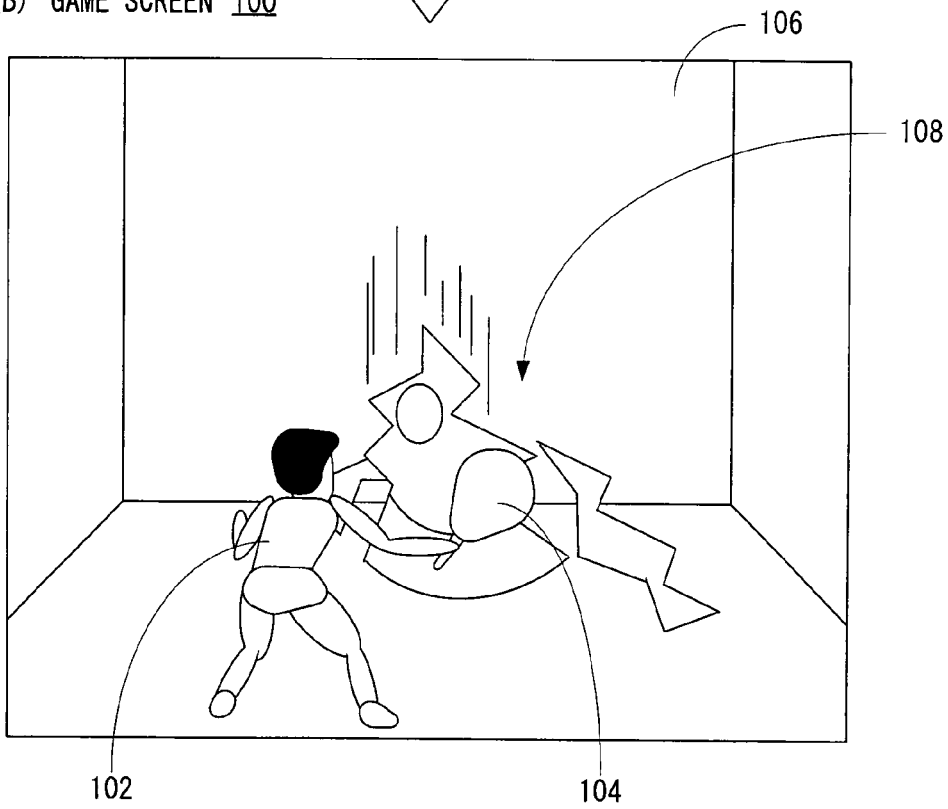

When the player character 102 hits a ball 110 and the ball 110 contacts (hits or collides with) a target object 108, the target object 108 breaks and falls down onto the ground or floor. In FIG. 6 (A), a game screen 100 is displayed showing a scene immediately after the ball 110 hit by the player character 102 has collided with the target object 108. For easy understanding, the ball 110 is not illustrated. Although on the game screen 100 of FIG. 6 (A) a central location (central break location) 120 for the case where the target object 108 breaks is indicated by a black circle, on an actual game screen 110 the central break location 120, i.e., the black circle, is not displayed. In FIG. 6 (B), a game screen 100 is displayed showing a scene in which the broken target object 108 is falling down.

When a ball 110 hit by the player character 102 collides with a target object 108, points are added (scoring process). For example, the closer the collision location is to the center of the target object 108, the higher the points. When the player character 102 can successively hit balls 110 against target objects 108, a bonus may be added to normal points.

Though not shown, when a ball 110 hit by the player character 102 does not hit a target object 108, the ball 110 may then rebound off the wall 108 or the floor or may go out of a predetermined area (a court that is not shown). Note that when a ball 110 hit by the player character 102 goes out of the court, points are subtracted (point subtraction process). Alternatively, the life of the player character 102 (e.g., the number of balls 110 that the player can use) is subtracted.

Here, when representing a scene in which, as described above, by a ball 110 colliding with a target object 108 the target object 108 breaks, it may be considered to represent the scene in which the target object 108 breaks, by, for example, including the target object 108 with a multitude of part images (parts), detecting a location (collision location) where the ball 110 has collided, and providing movement display such that the parts fly off radially with the collision location being the center and thereafter the parts fall down.

However, when using one type of a target object 108, assuming various collision locations, the target object 108 needs to be configured by relatively fine-sized parts. In such a case, there is a need to calculate a movement trajectory of each part and thus the load of such a computation process is high and moreover the load of image processing also increases.

Hence, the following approach may also be considered. A plurality of types of animation showing a scene in which a target object 108 is breaking are prepared, one piece of animation is selected according to a location where a ball 110 has hit, and a scene in which the target object 108 is breaking is played back in accordance with the selected animation. However, taking into account the trouble caused when developing animation and memory capacity, it is not appropriate to adopt such a method in a game. In addition, if the number of pieces of animation is reduced to avoid the trouble of development and a strain on memory capacity, an unnatural game screen may result or a game screen may become monotonous; consequently, the player may get tired of the game.

In view of this, in this exemplary embodiment, image processing is simplified as much as possible to the extent that a game screen does not become monotonous and moreover a natural look is not lost. A specific description will be made below.

Figure 7:
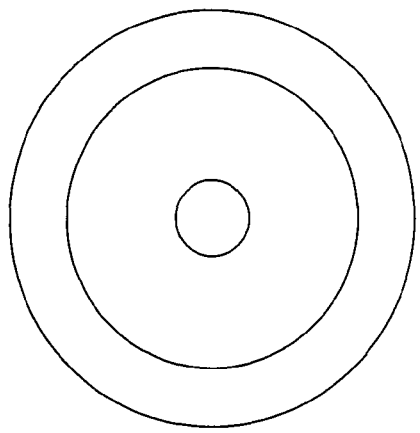
FIG. 7 is an illustrative view for describing a normal target image and several different types of broken target images to be displayed as target objects on the game screen.
Figure 7:
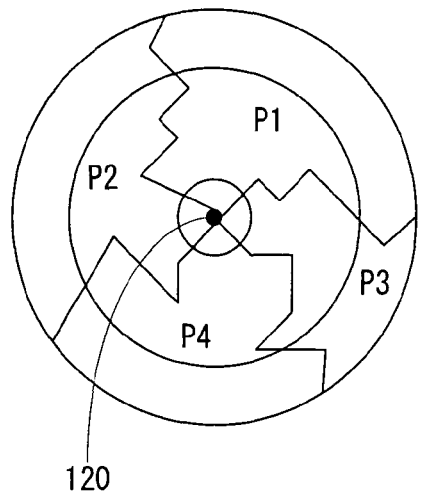
Figure 7:
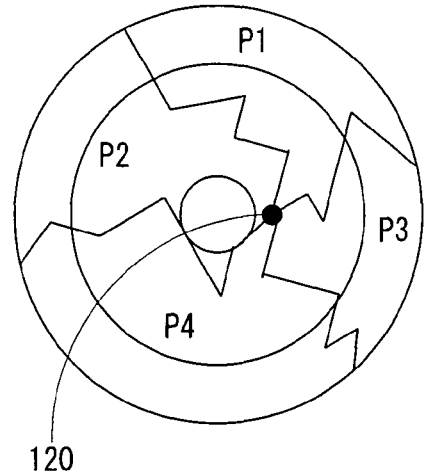
Figure 7:
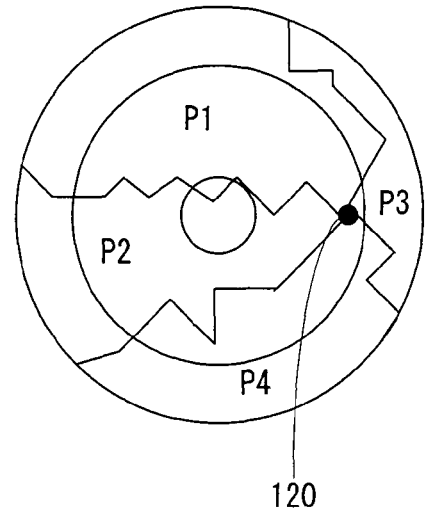

As shown in FIGS. 7 (A) to 7 (D), in the virtual game of this exemplary embodiment, there are prepared in advance an image (normal target image) 130 for displaying a normal target object 108 with which a ball 110 is not collided and three types of images (a first broken target image 140, a second broken target image 150, and a third broken target image 160) for displaying a scene in which a target object 108 breaks by collision of a ball 110.

In the normal target image 130 shown in FIG. 7 (A), a texture constituting a pattern in which areas are distinguished by concentric circles with different sizes is attached to a circular or disk-shaped polygon model formed by combining a plurality of polygons. Although, for convenience of the drawing, the distinction of the areas is shown by simply drawing circles, in practice, the areas may be distinguished by using different colors or by using a single color and changing the brightness of the color or using a monochrome and changing the brightness of the monochrome.

FIG. 7 (B) shows the first broken target image 140, FIG. 7 (C) shows the second broken target image 150, and FIG. 7 (D) shows the third broken target image 160. As will be descried later, the first broken target image 140, the second broken target image 150, and the third broken target image 160 are selectively used according to a location where a ball 110 has collided with a target object 108. To put it in a simply way, when a ball 110 collides with a target object 108 at the center or near the center of the target object 108, the first broken target image 140 is selected. When a ball 110 collides with a target object 108 at an edge of the target object 108, the third broken target image 160 is selected. When a ball 110 collides with a target object 108 at a location somewhere between the center and edge of the target object 108, the second broken target image 150 is selected.

The first broken target image 140 shown in FIG. 7 (B) is configured by four part images, i.e., parts P1, P2, P3, and P4. As can be seen from the drawing, the four parts P1, P2, P3, and P4 constituting the first broken target image 140 are joined together with respect to a joint point (central break location) 120. In this state, the first broken target image 140 has the same appearance as the normal target image 130 (the same shape, the same size, and the same pattern; the same applies hereinafter). In the first broken target image 140, the central break location 120 is set at the center of the image 140.

In the first broken target image 140 shown in FIG. 7 (B), to clarify the shapes of the parts P1, P2, P3, and P4, the outlines (separation lines) of the parts P1, P2, P3, and P4 are provided. In addition, as described above, a black circle at the central break location 120 is not displayed. Though not shown, each of the parts P1, P2, P3, and P4 is configured by a plurality of polygons. Note, however, that a part may be configured by a single polygon. Although in this exemplary embodiment, for simplicity, the first broken target image 140 is configured by the four parts P1 to P4, the number or shape of the parts can be appropriately changed. These points also apply to the second broken target image 150 and the third broken target image 160, as will be described later.

The second broken target image 150 shown in FIG. 7 (C) is also configured by four parts P1, P2, P3, and P4. As can be seen from the drawing, the four parts P1, P2, P3, and P4 constituting the second broken target image 150 are joined together with respect to a central break location 120. In this state, the second broken target image 150 has the same appearance as the normal target image 130. In the second broken target image 150, the central break location 120 is set at a location a bit off the center of the image 150 in an outer perimeter direction.

The third broken target image 160 shown in FIG. 7 (D) is also configured by four parts P1, P2, P3, and P4. As can be seen from the drawing, the four parts P1, P2, P3, and P4 constituting the third broken target image 160 are joined together with respect to a central break location 120. In this state, the third broken target image 160 has the same appearance as the normal target image 130. In the third broken target image 160, the central break location 120 is set at an edge near an outer perimeter of the image 160.

The broken target images (140, 150, and 160) each have local coordinates. In a local coordinate system, as can be seen from FIGS. 7 (B) to 7 (D), each central break location 120 is set to be present on the plus (including the origin) side of the X-axis that serves as a reference axis (reference direction) of its corresponding broken target image (140, 150, or 160).

Figure 8:
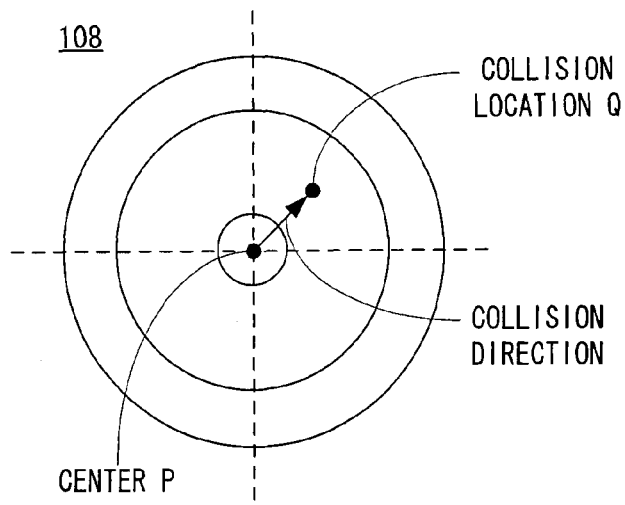
FIG. 8 is an illustrative view for describing a display method for providing break display of the target object on the game screen.
Figure 8:
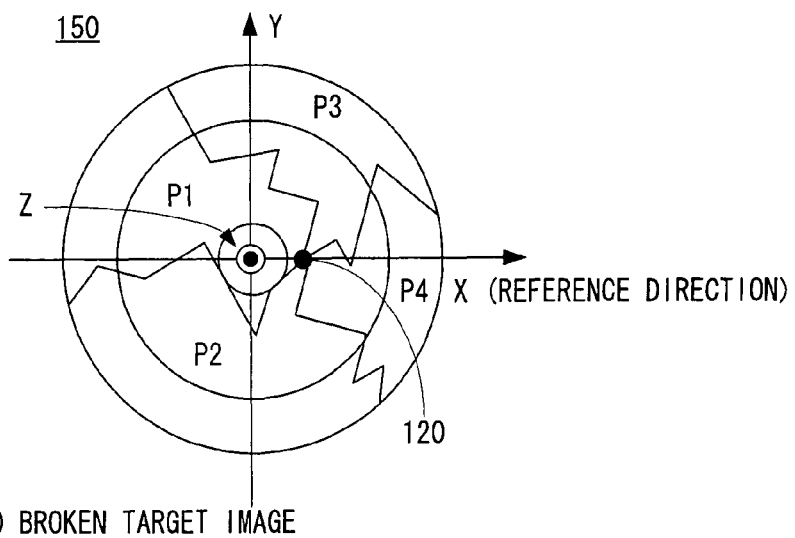
Figure 8:
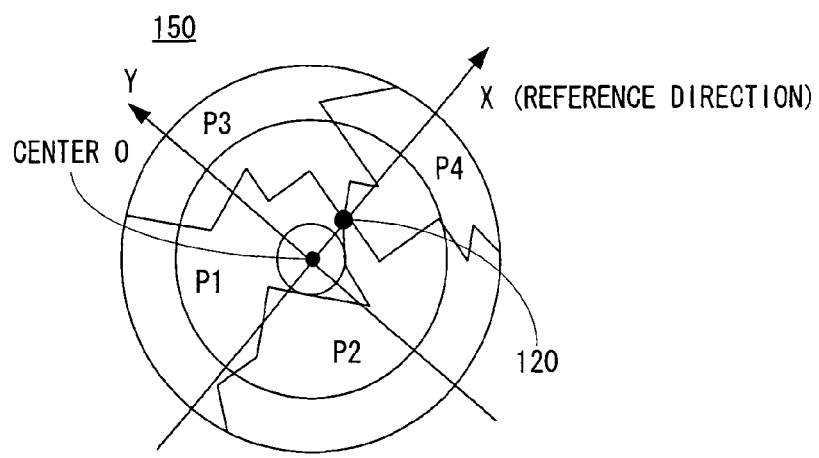

Now, a method of displaying on a game screen 100 a scene in which a target object 108 is breaking will be described. FIG. 8 (A) shows a target object 108 and a collision location Q of a ball 110 is indicated by a black circle. The collision location Q is a location where the ball 110 has actually collided with the target object 108, and is different than a central break location 120 of a broken target image (140, 150, or 160).

A horizontal bar indicated by a dashed line in FIG. 8 (A) is a straight line parallel to the X-axis in the virtual three-dimensional space (world coordinates), and a vertical bar indicated similarly by a dashed line is a straight line parallel to the Y-axis of the world coordinates. Both of the straight lines pass through a center P of the target object 108.

When, for example, a ball 110 collides with a target object 108, a collision location Q is detected and a distance d between a center P (x1, y1, z1) and the collision location Q (x2, y2, z2) is calculated. Specifically, the distance d is calculated according to Equation 1. Note that a target object 108 of this exemplary embodiment is a planar object and z1 is equal to z2 and thus a Z component is ignored.

Distance $d = \sqrt{\{(x1-x2)^2 + (y1-y2)^2\}}$ (Equation 1)

When the distance d is calculated, a broken target image (140, 150, or 160) is selected according to the distance d. In this exemplary embodiment, a broken target image selection table such as the one shown in FIG. 9 is prepared. A broken target image (140, 150, or 160) is selected according to the broken target image selection table. As can be seen from FIG. 9, when the distance d is less than a length L1, a collision location Q is at a center O of the normal target image 130 or near the center O and thus the first broken target image 140 is selected. When the distance d is greater than or equal to the length L1 and less than a length L2, a collision location Q is at a location outward from the center of the normal target image 130 and inward from the edge of the normal target image 130 and thus the second broken target image 150 is selected. When the distance d is greater than or equal to the length L2, a collision location Q is near the edge of the normal target image 130 and thus the third broken target image 160 is selected. The reason that a broken target image (140, 150, or 160) is thus selected according to the broken target image selection table is to display a scene in which a target object 108 is breaking such that a collision location Q matches or substantially matches a central break location 120. Here, it is assumed that, based on the collision location Q shown in FIG. 8 (A), the second broken target image 150 is selected as shown in FIG. 8 (B).

Note that the lengths (thresholds) L1 and L2 are design matters that are appropriately set by a developer or a game programmer based on the size or the like of a target object 108 (normal target image 130).

Then, based on the collision location Q, a determinant is calculated for placing the broken target image (140, 150, or 160) in the virtual three-dimensional space (world space). For example, a determinant A for placing the display location of a target object 108, i.e., the normal target image 130 or the broken target image (140, 150, or 160), in the world space is represented by Equation 2.

Note that as can be seen from FIG. 8 (B), the local coordinates of the second broken target image 150 (the same applies to other broken target images 140 and 160) are defined such that the right direction is the plus direction of the X-axis, the upward direction is the plus direction of the Y-axis, and the upward vertical direction relative to the paper is the plus direction of the Z-axis. In addition, in the broken target image (140, 150, or 160), it is defined that the central break location 120 is generated in the plus direction of the X-axis of the local coordinates.

$$A = \begin{bmatrix} Xx & Yx & Zx & Px \\ Xy & Yy & Zy & Py \\ Xz & Yz & Zz & Pz \end{bmatrix}$$ (Equation 2)

Here, each element of the determinant has the following meaning. When the normal target image 130 or the broken target image (140, 150, or 160) are placed in the world space, elements (Xx, Xy, Xz) indicate a direction to which the X-axis of the local coordinates is applied, elements (Yx, Yy, Yz) indicate a direction to which the Y-axis of the local coordinates is applied, elements (Zx, Zy, Zz) indicate a direction to which the Z-axis of the local coordinates is applied, and elements (Px, Py, Pz) are world coordinates where the center O of the local coordinates is put.

That is, a determinant B for the case where a target object 108 is oriented in a direction indicated by a vector (nx, ny, nz) in the world space and the center of the target object 108 is put at the world coordinates (x1, y1, z1) is represented by Equation 3. The vector (nx, ny, nz) is a unit vector of a direction (hereinafter, referred to as a "collision direction") oriented toward a collision location Q from a center P of the target object 108, and is calculated when a ball 110 has collided with (contacted) the target object 108.

Here, a reference direction of the target object 108 is the plus direction of the X-axis of the world coordinates and a reference direction of the normal target image 130 is the plus direction of the X-axis of the local coordinates. As described above, the reference direction of the broken target image (140, 150, or 160) is the plus direction of the X-axis of the local coordinates. These reference directions indicate the orientations of the respective images (objects). The same applies hereinafter.

$$B = \begin{bmatrix} a11 & a12 & nx & x1 \\ a21 & a22 & ny & y1 \\ a31 & a32 & nz & z1 \end{bmatrix} \quad \text{(Equation 3)}$$

Note that elements a11, a12, a21, a22, a31, and a32 are calculated according to the collision location Q of the ball 110.

First, the direction (direction vector (mx, my, mz)) to which the X-axis (reference direction) of the local coordinates of the broken target image (140, 150, or 160) is applied is calculated from the center P (x1, y1, z1) of the ball 110 in the world coordinates and the collision location Q (x2, y2, z2), according to Equation 4. Note that mx, my, and mz each are a variable. The direction vector (mx, my, mz) calculated according to Equation 4 is a vector of the collision direction shown in FIG. 8 (A).

$$mx = x2 - x1$$

$$my = y2 - y1$$

$$mz = z2 - z1 \quad \text{(Equation 4)}$$

Subsequently, the direction vector (mx, my, mz) is transformed, according to Equation 5, into a vector parallel (referred to as "parallel vector" for convenience of description) to a plane of the target object 108 (plane parallel to an XY-plane) and having no components in a front direction of the target object 108 (the plus direction of the Z-axis).

$$mx = mx - f1 \times nx$$

$$my = my - f1 \times ny$$

$$mz = mz - f1 \times nz$$

$$f1 = mx \times nx + my \times ny + mz \times nz \quad \text{(Equation 5)}$$

Then, the parallel vector is transformed, according to Equation 6, into a unit vector whose length (magnitude) is 1.

$$mx = mx/f2$$

$$my = my/f2$$

$$mz = mz/f2$$

$$f2 = \sqrt{\{(mx)^2 + (my)^2 + (mz)^2\}} \quad \text{(Equation 6)}$$

The unit vector (mx, my, mz) determined according to Equation 6 has elements (a11, a21, a31) shown in Equation 3. Therefore, the determinant B is represented by Equation 7.

$$B = \begin{bmatrix} mx & a12 & nx & x1 \\ my & a22 & ny & y1 \\ mz & a32 & nz & z1 \end{bmatrix} \quad \text{(Equation 7)}$$

Subsequently, in the world coordinates, a direction (direction vector (kx, ky, kz)) to which the Y-axis of the local coordinates of the broken target image (140, 150, or 160) is applied is determined. Here, the Y-axis of the local coordinates is a direction intersecting both the X-axis and Z-axis of the local coordinates, and thus, as shown in Equation 8, the direction vector (kx, ky, kz) can be easily determined by an outer product computation. Note that kx, ky, and kz each are a variable.

$$kx = mz \times ny - my \times nz$$

$$ky = mx \times nz - mz \times nx$$

$$kz = my \times nx - mx \times ny \quad \text{(Equation 8)}$$

The direction vector (kx, ky, kz) calculated according to Equation 8 has elements (a12, a22, a32) shown in Equations 3 and 7. Therefore, the determinant B is represented by Equation 9. The direction vector (kx, ky, kz) is a unit vector whose magnitude is 1.

$$B = \begin{bmatrix} mx & kx & nx & x1 \\ my & ky & ny & y1 \\ mz & kz & nz & z1 \end{bmatrix} \quad \text{(Equation 9)}$$

By placing the broken target image (140, 150, or 160) in the world space using the determinant B shown in Equation 9, the broken target image (140, 150, or 160) in a desired orientation (the orientation of the unit vector (nx, ny, nz) of a collision direction) can be displayed as a target object 108. Specifically, when the second broken target image 150 is placed in the virtual three-dimensional space using the determinant B calculated based on the collision location Q shown in FIG. 8 (A), as shown in FIG. 8 (C), the second broken target image 150 is placed in the virtual three-dimensional space such that the X-axis (reference direction) of the local coordinates of the image 150 is oriented in the collision direction Q shown in FIG. 8 (A) and the center O of the image 150 is present at the world coordinates (x1, y1, z1).

Subsequently, an initial speed (speed vector) of each of the parts P1, P2, P3, and P4 is calculated. Thereafter, the parts P1, P2, P3, and P4 are moved based on the calculated initial speeds and gravity (gravitational acceleration G) set in the virtual three-dimensional space and according to vertical projectile motion or parabolic motion. Namely, by a simple physical computation, the parts P1 to P4 are moved and displayed. Accordingly, a scene in which the target object 108 breaks and the parts P1, P2, P3, and P4 fly off and fall down onto the ground is represented.

Note that the gravitational acceleration G in the virtual three-dimensional space is different than the above-described gravitational acceleration g in the real world.

Here, although the gravitational acceleration G is fixedly set in the virtual three-dimensional space, the initial speed is randomly determined Strictly speaking, although the magnitude of the initial speed is randomly determined, the direction of the initial speed is determined according to a predetermined rule. This is to represent a scene in which parts P1, P2, P3, and P4 fly off with a collision location Q of a ball 110 (strictly speaking, a central break location 120) being the center.

Figure 10:
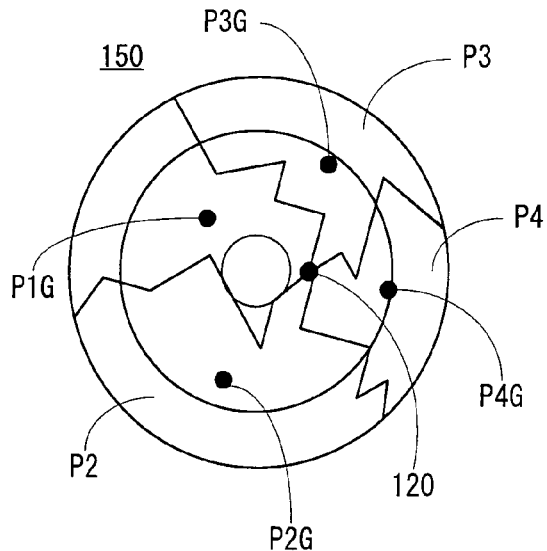
FIG. 10 is an illustrative view for describing a display method for providing break display of the target object on the game screen.
Figure 10:
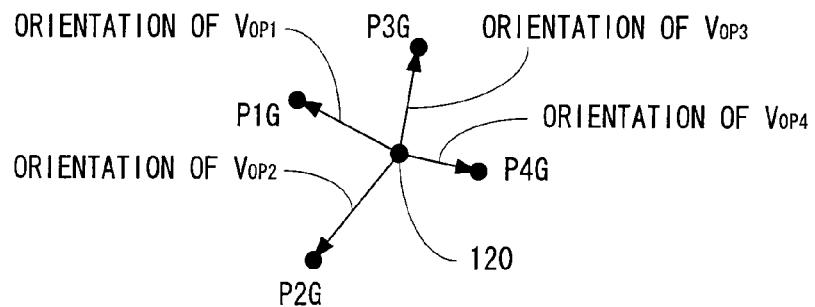
Figure 10:
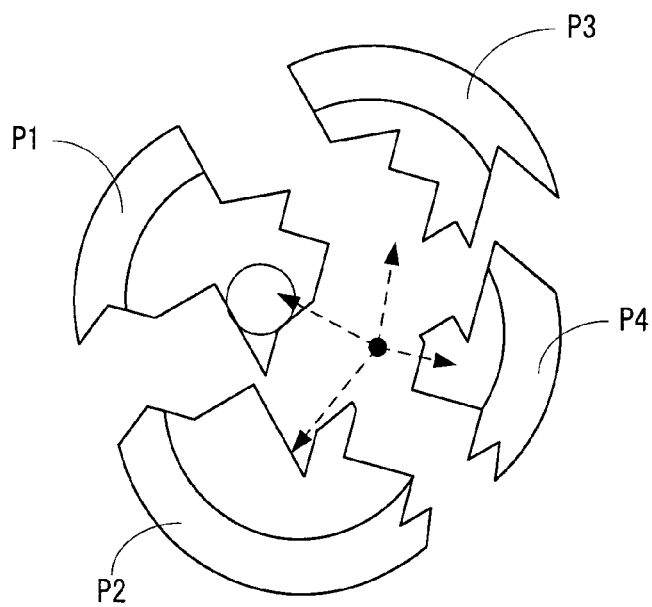

Specifically, as shown in FIG. 10 (A), in a second broken target image 150, parts P1, P2, P3, and P4 each have local coordinates and a reference location, i.e., the center (or the center of gravity), to be used when the image 150 is placed at the world coordinates is set. Though not shown, the same applies to other broken target images (140 and 160). The directions of initial speeds of the respective parts P1, P2, P3, and P4 are determined based on centers P1G, P2G, P3G, and P4G and a central break location 120 that are obtained after the broken target image (140, 150, or 160) is placed in the virtual three-dimensional space.

As shown in FIG. 10 (B), directions oriented toward the center coordinates P1G to P4G of the respective parts P1 to P4 from the central break location 120 of the second broken target image 150 obtained after being placed in the virtual three-dimensional space are directions of initial speeds $V_{0P1}$ to $V_{0P4}$ of the respective parts P1 to P4. That is, the directions of the initial speeds $V_{0P1}$ to $V_{0P4}$ are determined by orientations of vectors with start points being the central break location 120 and end points being the respective center coordinates P1G to P4G. Therefore, as shown in FIG. 10 (C), the parts P1 to P4 fly off in the directions of the initial speeds $V_{0P1}$ to $V_{0P4}$ and thereafter move (fall down) according to the gravitational acceleration G.

Note that although, in this exemplary embodiment, as described above, the magnitude of the initial speeds $V_{0P1}$ to $V_{0P4}$ is randomly determined, the magnitude of the initial speeds $V_{0P1}$ to $V_{0P4}$ may be calculated according to the sizes (weights) of parts P1 to P4 or the impact force or impulse (speed×weight) of a collided ball 110.

Figure 11:
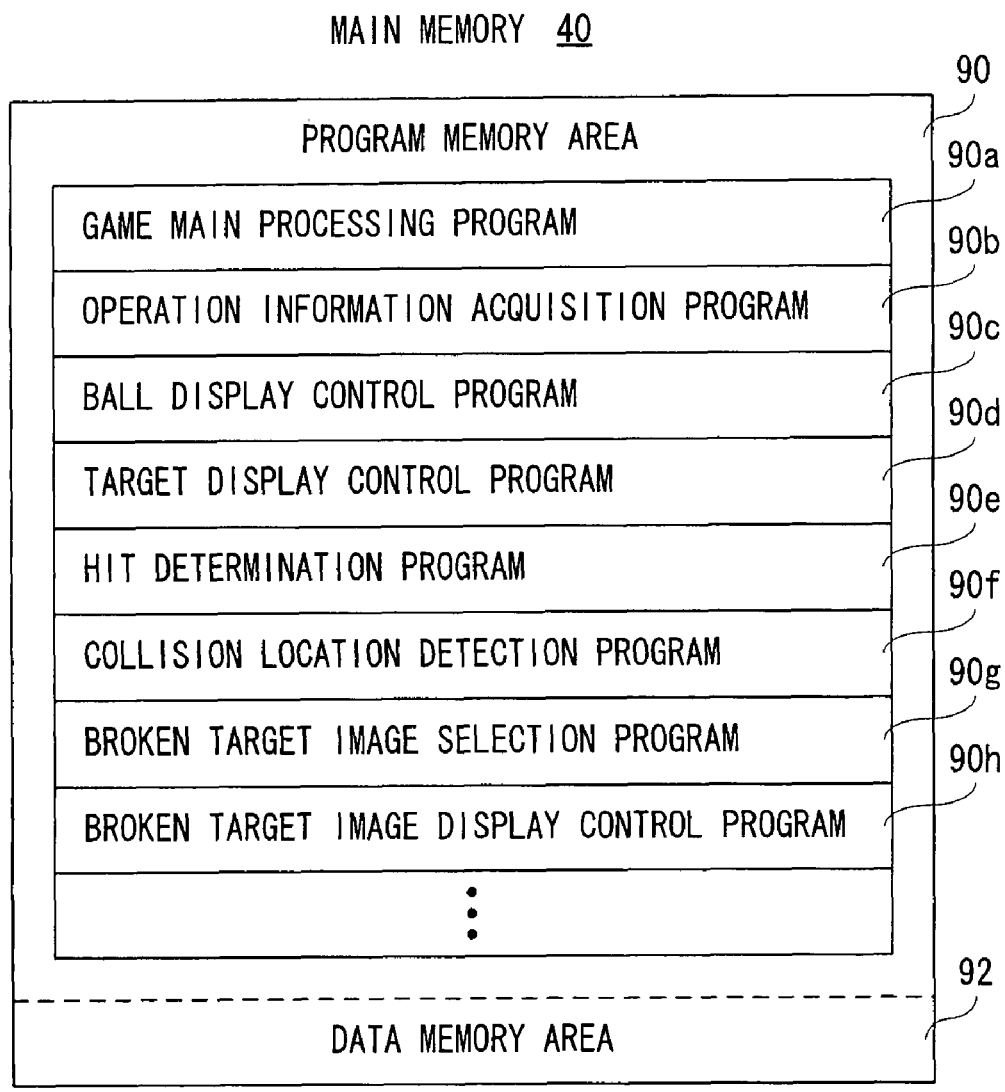
FIG. 11 is an illustrative view showing an example of a memory map of a main memory shown in FIG. 2.

FIG. 11 is an illustrative diagram showing an example of a memory map of the main memory 40 shown in FIG. 2. Referring to FIG. 11, the main memory 40 includes a program memory area 90 and a data memory area 92. The program memory area 90 stores therein a game program. The game program includes a game main processing program 90a, an operation information acquisition program 90b, a ball display control program 90c, a target display control program 90d, a hit determination program 90e, a collision location detection program 90f, a broken target image selection program 90g, a broken target image display control program 90h, and the like.

The game main processing program 90a is a program for processing a main routine of a virtual game of this exemplary embodiment. The operation information acquisition program 90b is a program for acquiring operation information (input data) to be transmitted from the controller 22. For example, when the CPU 36 executes the operation information acquisition program 90b, the memory controller 38 searches, according to an instruction from the CPU 36, a buffer (not shown) provided in the controller I/F 56. If input data is stored in the buffer in the controller I/F 56, the memory controller 38 then acquires (reads) the input data and temporarily stores (writes) the input data in an input data buffer 92a in the main memory 40.

The ball display control program 90c controls movement of a ball 110 in the virtual three-dimensional space. Though a detailed description is not given herein, by the CPU 36 executing the ball display control program 90c, by serving a ball 110 the ball 110 moves toward a player character 102, or by the player character 102 performing a hit operation the ball 110 moves toward the wall 106 or a target object 108 or moves such that the ball 110 rebounds off the wall 106 or the target object 108.

The movement direction and movement speed of a ball 110 hit by the player character 102 can be determined by the timing or speed (strength) of a swing operation performed on the controller 22 by the player. When an instruction for a hit action is inputted by a button operation on the controller 22, the speed (strength) can be changed by using different types of buttons. For the determination of the movement direction and movement speed of a ball 110 by such a hit action, known techniques for tennis ball games can be adopted; in addition, such determination is not the essential content of the certain exemplary embodiments described herein and thus a detailed description thereof is not given herein.

The target display control program 90d is a program for controlling display of a normal target image 130 using normal target image data 92c (see FIG. 12), as will be described later. For example, a normal target image 130 is placed such that a center O of local coordinates of the normal target image 130 is put at a predetermined location ((x1, y1, z1) in this exemplary embodiment) of a wall 106 provided in the virtual three-dimensional space. Timing at which a normal target image 130 is placed in the virtual three-dimensional space is when, upon start of a game, a game start screen is displayed or when, after a target object 108 being displayed is broken, the game continues.

The hit determination program 90e is a program for determining whether a ball 110 has hit some kind of object (a wall (106), a target object 108, a floor, or the like in this exemplary embodiment) in the virtual three-dimensional space. A hit determination is already known and thus a detailed description thereof is not given herein.

The collision location detection program 90f detects, when it is determined according to the hit determination program 90e that a ball 110 has hit a target object 108, a location (collision location Q) where the ball 110 has hit the target object 108. Specifically, when it is detected that a ball 110 has hit a target object 108, a central location of the ball 110 at that time is detected and a point obtained by translating the central location onto the target object 108 is determined as a collision location Q.

The broken target image selection program 90g is a program for selecting a broken target image (140, 150, or 160). Specifically, when the CPU 36 executes the broken target image selection program 90g, the CPU 36 calculates, according to Equation 1, a distance d between a center P of a target object 108 and a collision location Q detected according to the collision location detection program 90f and refers to a broken target image selection table 92e stored in the data memory area 92 and thereby selects a broken target image (140, 150, or 160).

The broken target image display control program 90h is a program for placing, as a target object 108, a broken target image (140, 150, or 160) selected by the broken target image selection program 90g based on a collision location Q detected according to the collision location detection program 90f, in the virtual three-dimensional space and then causing parts (P1, P2, P3, and P4) constituting the broken target object 108 to be randomly moved and displayed.

Specifically, a broken target image (140, 150, or 160) is placed in the virtual three-dimensional space instead of a normal target image 130, such that a reference direction (the X-axis of local coordinates) of the broken target image (140, 150, or 160) is applied to a direction determined by a center P of a target object 108 and a collision location Q. As described above, a determinant B is determined based on the collision location Q and by using the determinant B the broken target image (140, 150, or 160) is placed. Subsequently, initial speeds $V_{0P1}$ to $V_{0P4}$ of respective parts P1 to P4 are calculated. Then, movement of the parts P1 to P4 is controlled such that the parts P1 to P4 perform vertical projectile motion or parabolic motion based on the calculated initial speeds $V_{0P1}$ to $V_{0P4}$ and gravitational acceleration G.

Though not shown, the game program also includes other programs such as a sound output program and a backup program. The sound output program is a program for outputting sound (voice and music) necessary for a game, such as the voice and imitative sound of a game character such as a player character 102, sound effects, and BGM. The backup program is a program for storing (saving) game data on the memory card 30 according to an instruction from the player or a predetermined game event.

Figure 12:
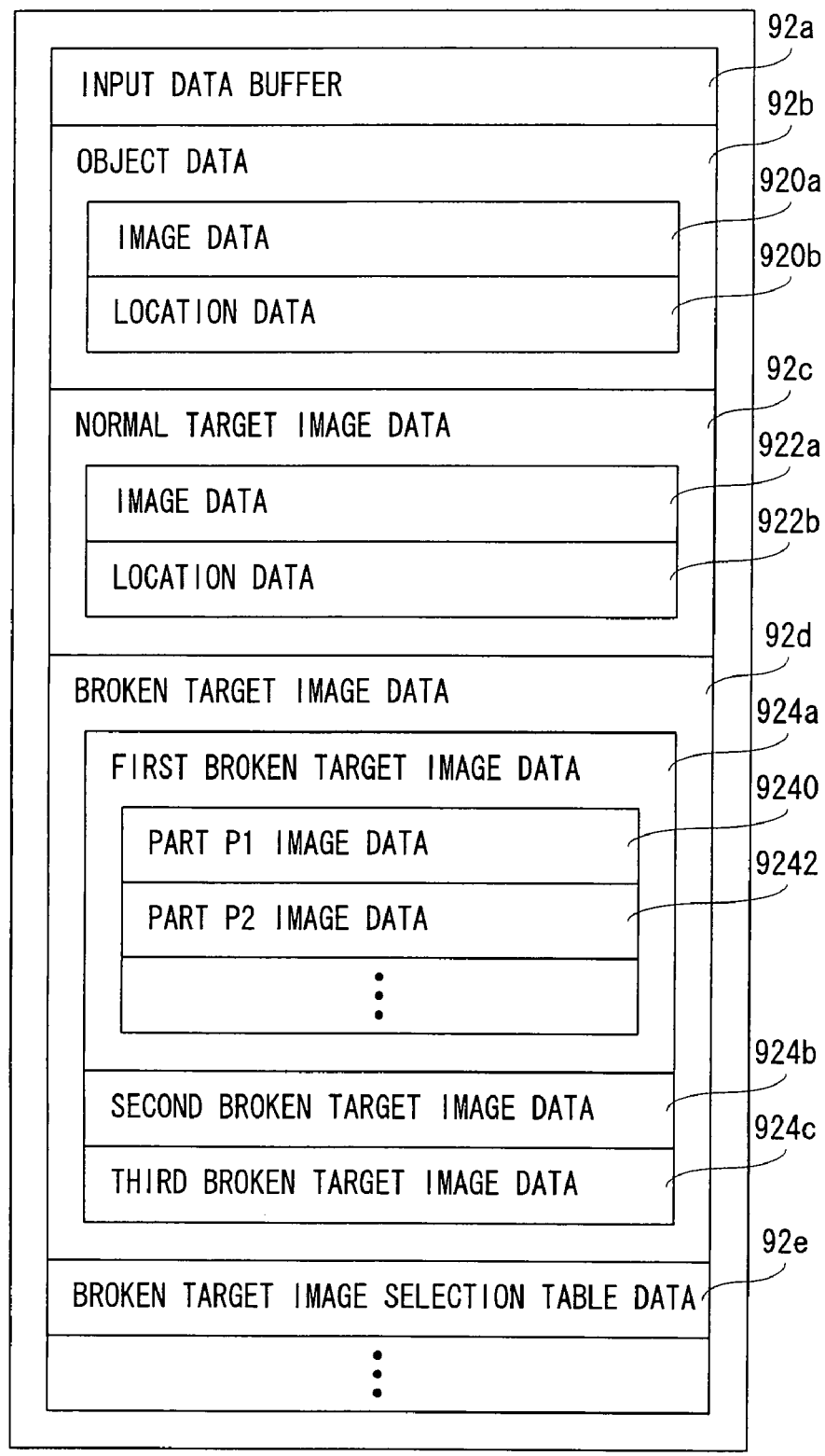
FIG. 12 is an illustrative view showing specific contents of a data memory area shown in FIG. 11.

FIG. 12 shows specific contents of the data memory area 92 shown in FIG. 11. Referring to FIG. 12, in the data memory area 92 is provided an input data buffer 92a. The data memory area 92 stores therein object data 92b, normal target image data 92c, broken target image data 92d, broken target image selection table data 92e, and the like.

The input data buffer 92a is, as described above, an area for temporarily storing input data acquired by the memory controller 38 under instruction from the CPU 36 according to the operation information acquisition program 90b. The CPU 36 detects whether there is input data, by referring to the input data buffer 92a and determines, for example, whether there is an instruction for a hit action. Though a detailed description is not given herein, input data is used for game processing such as allowing a player character 102 to perform a hit action, and is then deleted from the input data buffer 92a.

The object data 92b is data on a game character or game objects, such as a player character 102, a racket 104, a wall 106, and a ball 110. The object data 92b includes image data 920a and location data 920b. The image data 920a is polygon data, texture data, and the like, for creating game objects such as those described above. The location data 920b is coordinate data on world coordinates for placing game objects such as those described above in the virtual three-dimensional space.

Location data on a player character 102, a racket 104, and a ball 110 is updated according to an instruction from a player or the proceeding of a game.

The normal target image data 92c is data on a normal target image 130. The normal target image data 92c includes image data 922a and location data 922b. The image data 922a is polygon data, texture data, and the like, for generating a normal target image 130. The location data 922b is coordinate data on world coordinates for placing a normal target image 130 in the virtual three-dimensional space.

The broken target image data 92d is data on each of broken target images (140, 150, and 160). Specifically, the broken target image data 92 includes first broken target image data 924a, second broken target image data 924b, and third broken target image data 924c. The first broken target image data 924a includes image data on parts (P1, P2, P3, and P4 in this exemplary embodiment). Specifically, the first broken target image data 924a is continued by part P1 image data 9240, part P2 image data 9242, and the like. The part P1 image data 9240 is polygon data, texture data, and the like, for creating the part P1 of the first broken target image 140. Though a detailed description is not given herein, the same applies to the part P2 image data 9242, and the like.

Note that the second broken target image data 924b and the third broken target image data 924c are the same as the first broken target image data 924a and thus a detailed description thereof is not given herein.

The broken target image selection table data 92e is data on the broken target image selection table shown in FIG. 9. As described above, the broken target image selection table data 92e is referred to when the CPU 36 selects a broken target image (140, 150, or 160) according to the broken target image selection program 90g.

Though not shown, in the data memory area 92 are stored sound data, game data, and the like, and is provided a counter (timer), a register, a flag, or the like, that is necessary for game processing.

Figure 13:
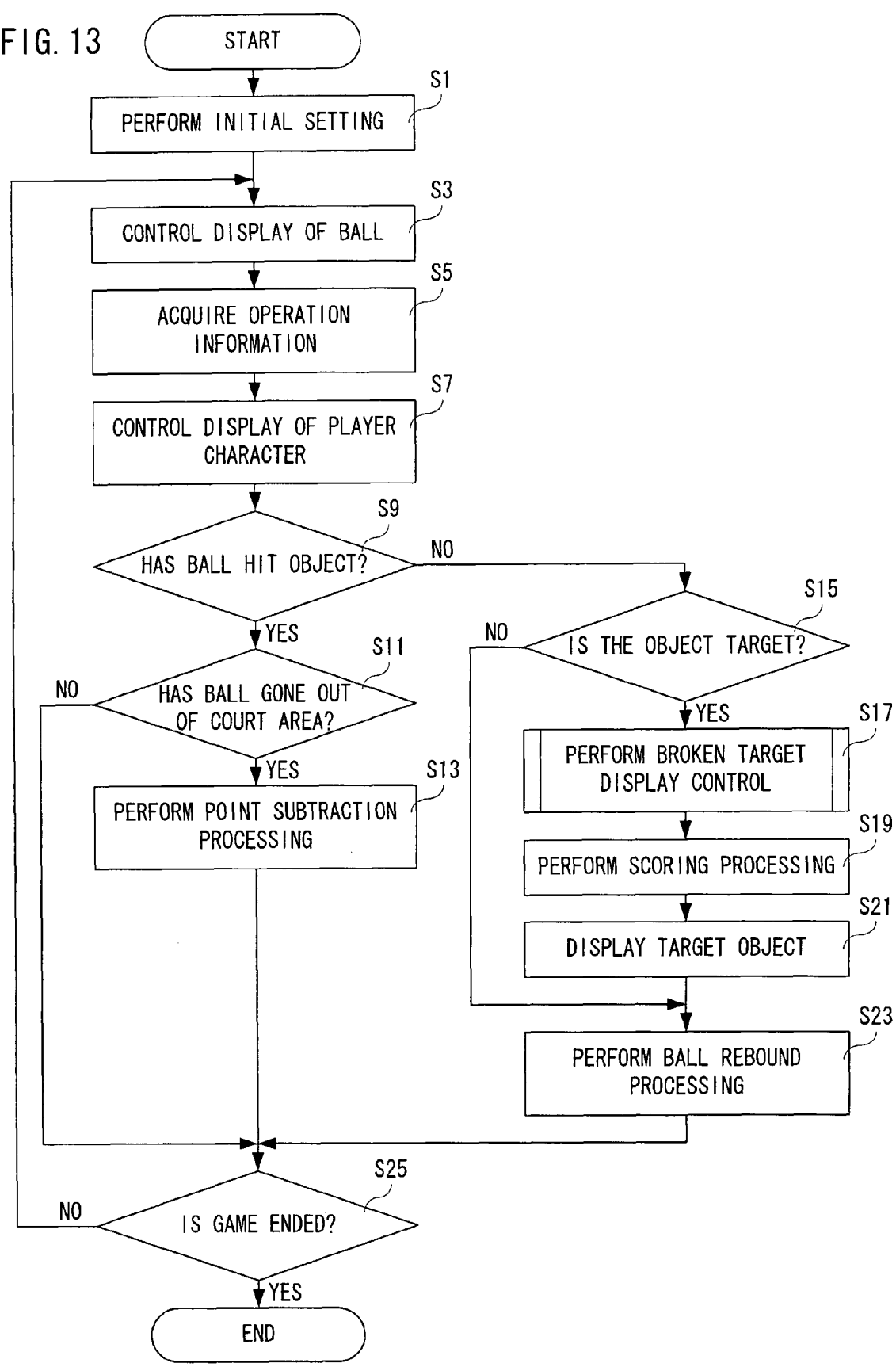
FIG. 13 is a flowchart showing an overall game processing of a CPU shown in FIG. 2.

Now, specific processing will be described. The CPU 36 shown in FIG. 2 performs overall game processing (main routine) according to a flowchart shown in FIG. 13. As shown in FIG. 13, when the CPU 36 starts the overall game processing, in a step S1, the CPU 36 performs an initial setting. In the initial setting, under instruction from the CPU 36, the memory controller 38 clears the buffer and initializes the counter, register, and flag. Note that when a game starts from a previous game, game data stored on the memory card 30 is loaded and initial values of the counter (timer), register, and flag, for example, are set. In addition, in the step S1, a game screen 100 for the start of a game (game start screen) is displayed. Specifically, a player character 102, a racket 104, a wall 106, a target object 108, and the like are created and placed (modeled) in a virtual three-dimensional space and a game start screen is displayed on the monitor 34. At this time, the object data 92b and the normal target image data 92c that are stored in the data memory area 92 are used.

In a subsequent step S3, display control of a ball is performed. Specifically, the CPU 36 updates the location of a ball 110 according to the location data 920b of the object data 92b. Thus, on the game screen 100, the ball 110 is moved and displayed. Though not shown, the location data on the ball 110 is updated by a physical computation according to a time (on a frame-by-frame basis), such that the ball 110 flies or rebounds.

Subsequently, in a step S5, operation information is acquired. Here, under instruction from the CPU 36, the memory controller 38 refers to the buffer in the controller I/F 56 and acquires input data and then temporarily stores the input data in the input data buffer 92a. Note that when input data is not stored in the buffer in the controller I/F 56, input data is not stored in the input data buffer 92a. In such a case, the CPU 36 determines that there is no instruction from a player.

In a subsequent step S7, display of the player character 102 is controlled. In this exemplary embodiment, the player character 102 is automatically moved to a location where the player character 102 can hit a ball 110. Specifically, the CPU 36 updates the location data on the player character 102 according to the location data on a ball 110 such that the player character 102 approaches the ball 110.

Then, in a step S9, it is determined whether the ball 110 has hit some kind of object. If "NO" in the step S9, i.e., if the ball 110 has not hit any object, then it is determined whether or not the ball 110 has gone out of a court area in a step S11. If "NO" in the step S11, i.e., if the ball 110 has not gone out of the court area, then the processing proceeds directly to a step S25. On the other hand, if "YES" in the step S11, i.e., if the ball 110 has gone out of the court area, then in a step S13, a point subtraction process is performed and the processing proceeds to the step S25.

If "YES" in the step S9, i.e., if the ball 110 has collided with some kind of object, then it is determined whether or not the object is the target object 108 in a step S15. If "NO" in the step S15, i.e., if the object is not the target object 108, then it is determined that the ball 110 has hit the wall 106 and the processing proceeds directly to a step S23.

On the other hand, if "YES" in the step S15, i.e., if the object is the target object 108, then in a step S17 a broken target display control process (see FIG. 14), as will be described later, is performed and in a step S19 a scoring process is performed. Then, in a step S21, a normal target image 130 is displayed as a next target object 108 and the processing proceeds to the step S23.

In the step S23, a ball rebound process is performed and the processing proceeds to the step S25. The ball rebound process is the same as motion of an object by a rebound in physics and thus a detailed description thereof is not given herein. Note that by appropriately changing a coefficient of rebound (coefficient of restitution) according to the difficulty level of the game or the proceeding of the game, the game can be prevented from becoming monotonous and can be made more fun. By the ball rebound process, display is provided such that the ball 110 rebounds off the racket 104, the wall (e.g., 106), the target object 108, and the floor.

In the step S25, it is determined whether to end the game. Here, it is determined whether there is an instruction from the player to end the game or whether the game is over. If "NO" in the step S25, i.e., if the game does not end, the processing returns to the step S3. On the other hand, if "YES" in the step S25, i.e., if the game ends, then the overall game processing ends there.

Figure 14:
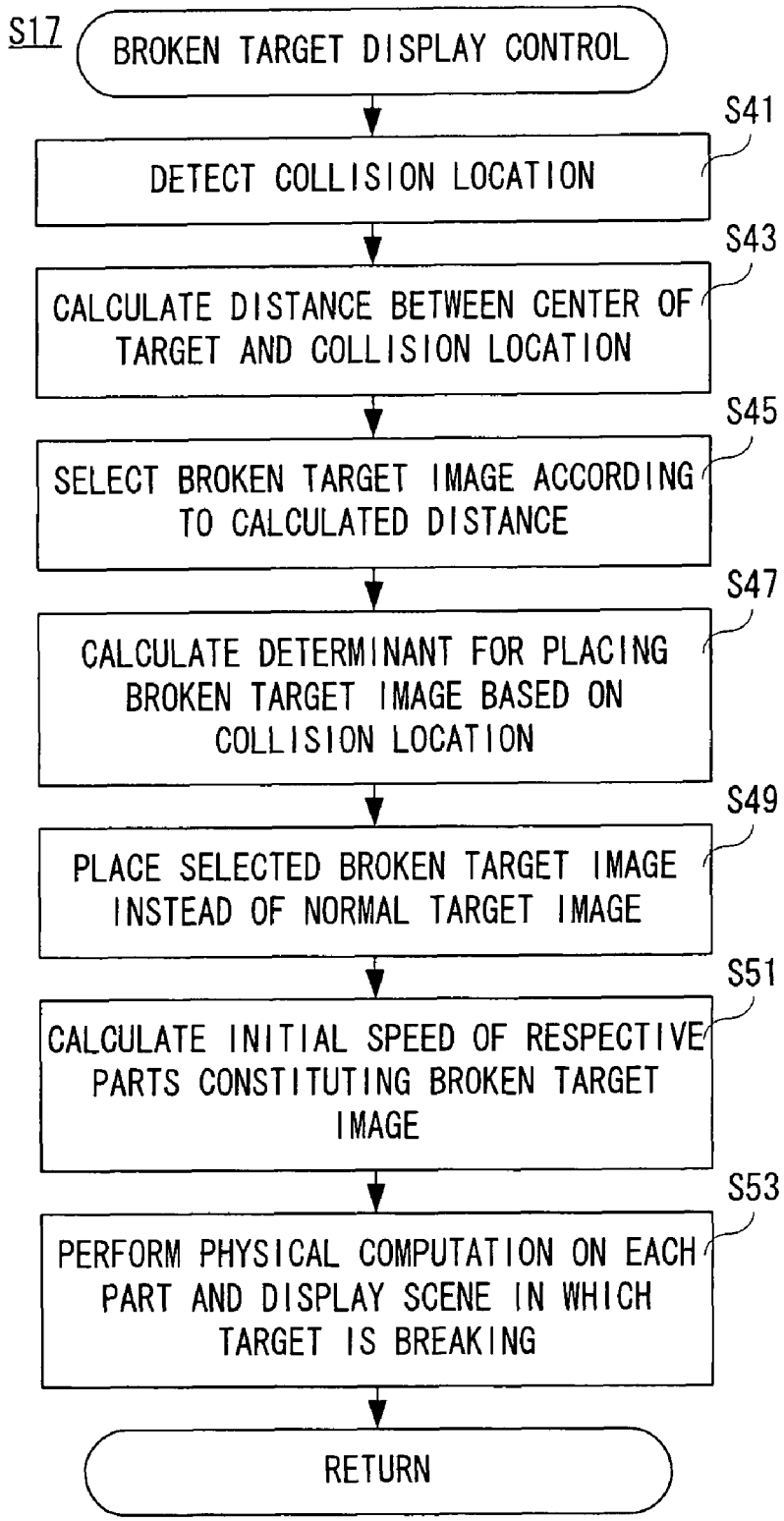
FIG. 14 is a flowchart showing a broken target display control process of the CPU shown in FIG. 2.

FIG. 14 is a flowchart of the broken target display control process in the step S17 shown in FIG. 13. As shown in FIG. 14, when the CPU 36 starts the broken target display control process, in a step S41, the CPU 36 detects a collision location Q. As descried above, a location (collision location Q) where the ball 110 has hit the target object 108 in the virtual three-dimensional space is calculated (detected). In a subsequent step S43, a distance d between a center P of the target object 108 and the collision location Q is calculated according to Equation 1.

In a subsequent step S45, by referring to the broken target image selection table data 92e stored in the data memory area 92, a broken target image (140, 150, or 160) is selected according to the distance d calculated in the step S43. In a subsequent step S47, as shown in Equations 3 to 9, based on the collision location Q, a determinant B for placing the broken target image (140, 150, or 160) selected in the step S45 in the virtual three-dimensional space is calculated.

Subsequently, in a step S49, the broken target image (140, 150, or 160) is placed, instead of a normal target image 130, in the virtual three-dimensional space using the determinant B. By this, the broken target image (140, 150, or 160) whose reference direction is oriented in a collision direction is displayed as a target object 108, on the game screen 100.

Then, in a step S51, initial speeds $V_{OP1}$ to $V_{OP4}$ of parts P1 to P4 constituting the broken target image (140, 150, or 160) are randomly calculated. Note that a random calculation is performed only on the magnitude of the initial speeds $V_{OP1}$ to $V_{OP4}$, and orientations of the initial speeds $V_{OP1}$ to $V_{OP4}$ are, as described above, calculated based on centers P1G, P2G, P3G, and P4G of the respective parts P1 to P4 and a central break location 120. Then, in a step S53, a physical computation is performed on each part (P1 to P4), a scene in which the target object 108 is breaking is displayed, and the process returns to the overall game processing. Specifically, in the step S53, locations of the respective parts P1 to P4 for each given period of time (a frame: unit of time for screen update (1/60 second)) are calculated (updated) using the initial speeds $V_{OP1}$ to $V_{OP4}$ calculated in the step S51 and gravitational acceleration G, and images of the parts P1 to P4 are placed (displayed) at the respective calculated locations.

According to this exemplary embodiment, a target image for normal display and several different types of broken target images are prepared and a broken target image selected according to a collision location is simply placed such that the orientation of a central break location of the broken target image matches a direction oriented toward the collision location from the center of the target image. Thus, without increasing the load of image processing, a scene in which a target is breaking according to various collision locations can be represented. That is, image processing can be simplified as much as possible to the extent that a game screen does not become monotonous.

In this exemplary embodiment, a circular target object is displayed so that even when the orientation of a broken target image is changed, an unnatural look is not caused. However, when it is not necessary to place importance on the look, the shape of a target object (broken target image) is not necessarily limited to a circle, and a polygon such as a triangle or a square may be used.

Although in this exemplary embodiment, for simplicity, only a target object that is displayed two-dimensionally (planarity) in a virtual three-dimensional space is described, it is not necessarily limited thereto.

Figure 15:
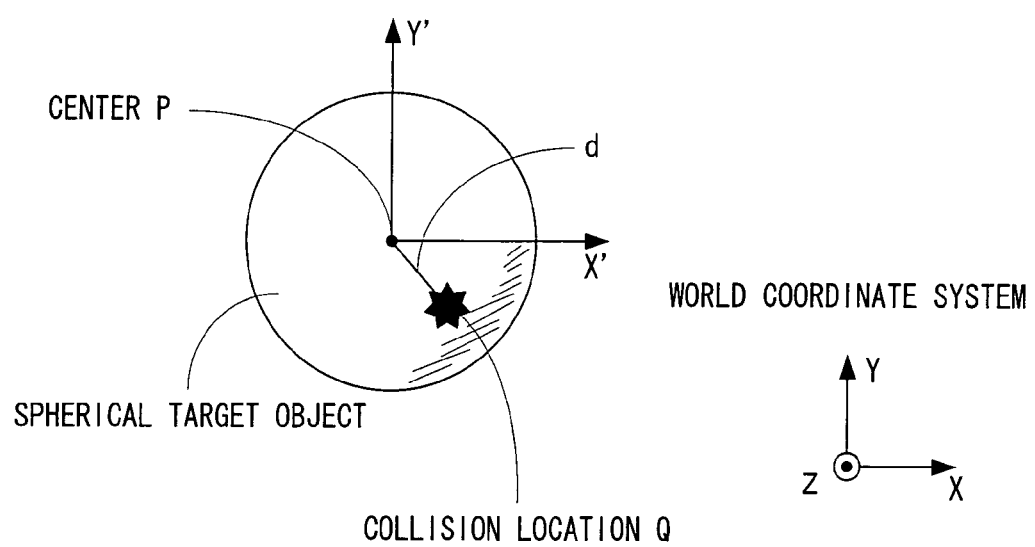
FIG. 15 is an illustrative view showing another example of the target object displayed on the game screen.

For example, even with a three-dimensional shape such as a spherical target object shown in FIG. 15, the certain exemplary embodiments described herein can be applied. Note that in FIG. 15 an X'-axis is an axis parallel to an X-axis of world coordinates and passing through a center P of the target object, and a Y'-axis is an axis parallel to a Y-axis of the world coordinates and passing through the center P of the target object. Though not shown, in such a case, each broken target image is constituted by three-dimensional parts. One of three axes of local coordinates (e.g., an X-axis) is a reference axis (reference direction) of a broken target image and a central break location is set on a plus side of the axis. A distance d in such a case is calculated according to Equation 10. Note that the coordinates of the center P of the target object are (x1, y1, z1) and the coordinates of a collision location Q are (x2, y2, z2).

$$d=\sqrt{\{(x1-x2)^2+(y1-y2)^2+(z1-z2)^2\}} \qquad \text{(Equation 10)}$$

Processes for selection of a broken target image, placement of the broken target image, and movement (falling down) of the broken target image are the same as those described in the aforementioned exemplary embodiment and thus the description will not be repeated.

For a three-dimensional shape, as with the aforementioned exemplary embodiment, importance is placed on the look and thus a sphere target object is exemplified. However, if importance is not placed on the look, even with a target object in any other three-dimensional shape such as a cube, a rectangular parallelepiped, or a polyhedron, the certain exemplary embodiments described herein can be applied.

Figure 16:
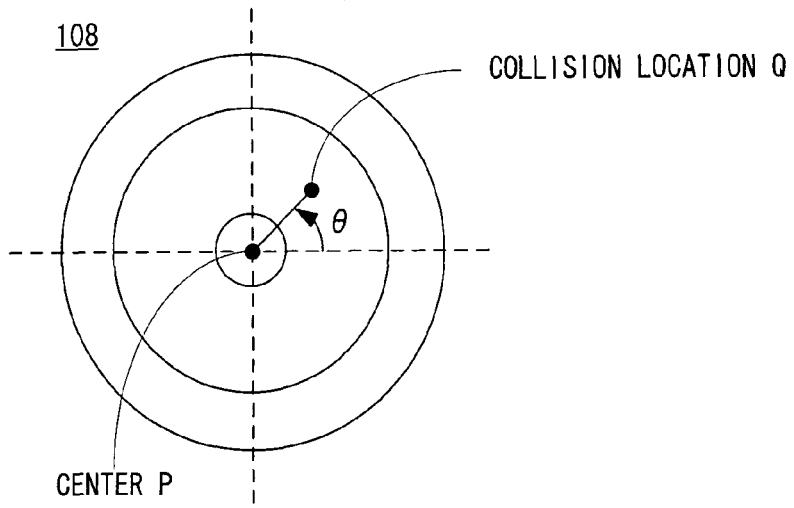
FIG. 16 is an illustrative view for describing another method of placing a broken target object.
Figure 16:
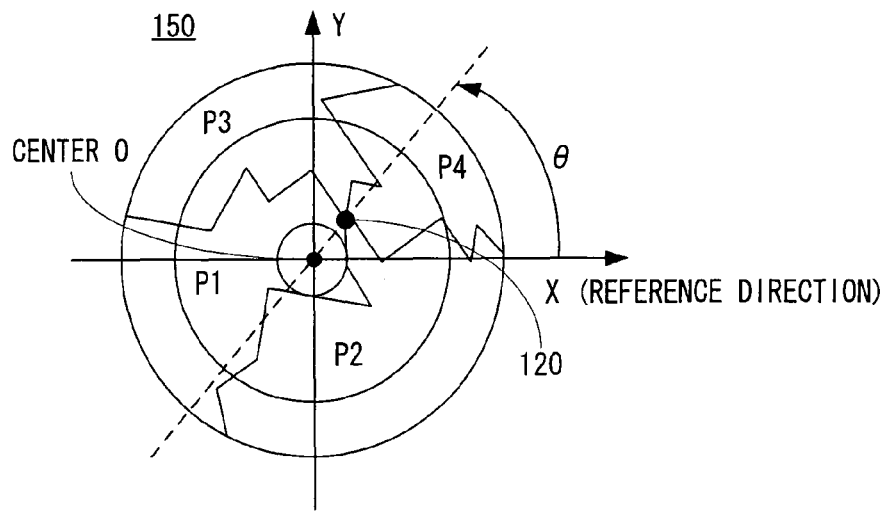
Figure 16:
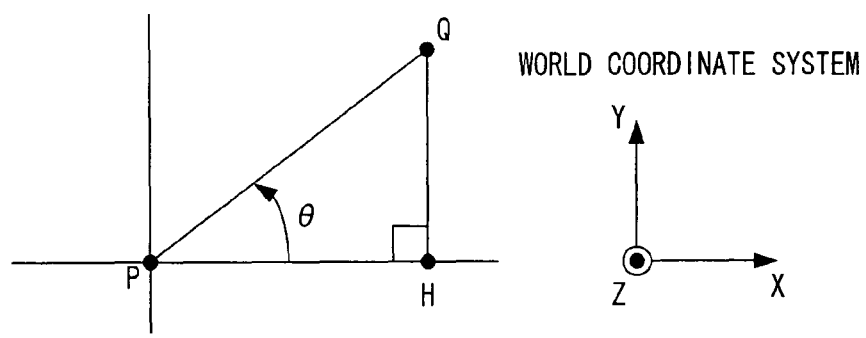

In the above-described exemplary embodiment, a broken target image is placed in a virtual three-dimensional space using a determinant calculated based on a collision location. However, it is also possible to place a broken target image by other methods. For example, as shown in FIG. 16 (A), when a collision location Q of a target object 108 is detected, an angle θ formed by a line segment PQ connecting a center P of the target object 108 and the collision location Q, and a reference axis (X-axis) is calculated. Then, as shown in FIG. 16 (B), a selected broken target image is rotated by the angle θ in local coordinates and thereafter a center of the local coordinates can be placed at a predetermined location in a virtual three-dimensional space. In such a case too, the broken target image can be placed such that the direction of a central break location of the broken target image matches a direction oriented toward the collision location from the center of a target object. Note that the direction in which the broken target image is rotated is the same as the direction of the calculated angle θ.

FIG. 16 (B) shows an example in which a broken target image 150 of the above-described exemplary embodiment is rotated counterclockwise by the angle θ around a center O of local coordinates.

As shown in FIG. 16 (C), a point H that drops down from the collision location Q to a straight line passing through the center P and parallel to an X-axis of world coordinates is calculated and by using any two of line segments PQ, PH, and QH, the angle θ can be easily determined by a trigonometric function.

Although in the above-described exemplary embodiment only a game system in which a video game apparatus, a controller, and a display apparatus are individually provided is described, needless to say, the certain exemplary embodiments described herein can also be applied to those in which a video game apparatus, a controller, and a display apparatus are integrally provided, such as a portable game apparatus, an arcade game machine, and a mobile terminal with game function.

Furthermore, although in the above-described exemplary embodiment a game is described in which a player character hits or hits back a ball to hit the ball against a target object, it is not necessarily limited thereto. The certain exemplary embodiments described herein can also be applied to a game in which, for example, a player character (player) shoots (fires) a bullet by using a tool or a weapon, such as a gun, to hit the bullet against a target object.

Although certain exemplary embodiments have been described and illustrated in detail, it is clearly understood that the same is by way of illustration and example only and is not to be taken by way of limitation, the spirit and scope of these certain exemplary embodiments described herein being limited only by the terms of the appended claims.

What is claimed is:

1. A non-transitory storage medium storing a game program for a game apparatus having operation programmed logic circuitry, storage programmed logic circuitry, and a display, said game program causing a computer of said game apparatus to function as:
    operation information acquisition programmed logic circuitry for acquiring operation information from said operation programmed logic circuitry;
    a first-object display controller for controlling display of a first object based on first-object image data stored in said storage programmed logic circuitry, said first object being fired or rebounded by a player based on the operation information acquired by said operation information acquisition programmed logic circuitry;
    a target object display for displaying a target object on said display, said target object being a target for contacting said first object by said player;
    a second-object display controller for controlling display of a second object based on any of a plurality of second-object image data stored in said storage programmed logic circuitry, said second object including a plurality of part images and having a same appearance as said target object;
    contact determination programmed logic circuitry for determining whether said first object has contacted said target object;
    a distance calculator for calculating, after it is determined by said contact determination programmed logic circuitry that said first object has contacted said target object, a distance from a center of said target object to a contact location;
    a direction calculator for calculating, after it is determined by said contact determination programmed logic circuitry that said first object has contacted said target object, a direction oriented toward said contact location from the center of said target object; and
    a selector for selecting any of a plurality of second objects according to the distance calculated by said distance calculator, wherein
    said second-object display controller allows the second object selected by said selector to be displayed so as to be oriented in the direction calculated by said direction calculator, and allows, after the display, each of the plurality of part images including the second object to be randomly moved and displayed.

2. A storage medium storing a game program, according to claim 1, wherein
    said second-object display controller allows the plurality of part images including said second object to be randomly moved and displayed, based on a physical computation with an initial speed of random magnitude being set to each of the plurality of part images and gravity being set in a downward direction of a display screen.

3. A storage medium storing a game program, according to claim 2, wherein
    said second-object display controller determines directions of vectors with respective start points being first world coordinates of a joint point of the plurality of part images including said second object and respective end points being second world coordinates of display reference locations of the respective plurality of part images, as directions of said respective initial speeds.

4. A storage medium storing a game program, according to claim 1, wherein
    each of said part images includes a single or a plurality of polygons.

5. A game apparatus comprising operation programmed logic circuitry, storage programmed logic circuitry, and a display, said game apparatus comprising:
    operation information acquisition programmed logic circuitry for acquiring operation information from said operation programmed logic circuitry;
    a first-object display controller for controlling display of a first object based on first-object image data stored in said storage programmed logic circuitry, said first object being fired or rebounded by a player based on the operation information acquired by said operation information acquisition programmed logic circuitry;
    a target object display for displaying a target object on said display, said target object being a target for contacting said first object by said player;
    a second-object display controller for controlling display of a second object based on any of a plurality of second-object image data stored in said storage programmed logic circuitry, said second object including a plurality of part images and having a same appearance as said target object;
    contact determination programmed logic circuitry for determining whether said first object has contacted said target object;
    a distance calculator for calculating, after it is determined by said contact determination programmed logic circuitry that said first object has contacted said target object, a distance from a center of said target object to a contact location;
    a direction calculator for calculating, after it is determined by said contact determination programmed logic circuitry that said first object has contacted said target object, a direction oriented toward said contact location from the center of said target object; and
    a selector for selecting any of a plurality of second objects according to the distance calculated by said distance calculator, wherein
    said second-object display controller allows the second object selected by said selector to be displayed so as to be oriented in the direction calculated by said direction calculator, and allows, after the display, each of the plurality of part images including the second object to be randomly moved and displayed.

6. A game control method for a game apparatus comprising operation programmed logic circuitry, storage programmed logic circuitry, and a display, said method including:
  (a) acquiring operation information from said operation programmed logic circuitry;
  (b) controlling display of a first object based on first-object image data stored in said storage programmed logic circuitry, said first object being fired or rebounded by a player based on the operation information acquired in (a);
  (c) displaying a target object on said display, said target object being a target for contacting said first object by said player;
  (d) controlling display of a second object based on any of a plurality of second-object image data stored in said storage programmed logic circuitry, said second object including a plurality of part images and having a same appearance as said target object;
  (e) determining whether said first object has contacted said target object;
  (f) calculating, after it is determined in (e) that said first object has contacted said target object, a distance from a center of said target object to a contact location;
  (g) calculating, after it is determined in (e) that said first object has contacted said target object, a direction oriented toward said contact location from the center of said target object;
  (h) selecting any of a plurality of second objects according to the distance calculated in (f); and
  (i) allowing the second object selected in (h) to be displayed so as to be oriented in the direction calculated in (g), and allowing, after the display, each of the plurality of part images including the second object to be randomly moved and displayed.

* * * * *